(12) United States Patent
Ishiahara et al.

(10) Patent No.: US 9,036,248 B2
(45) Date of Patent: May 19, 2015

(54) LIGHT GENERATION DEVICE AND LIGHT GENERATION METHOD

(75) Inventors: Hajime Ishiahara, Sakai (JP); Atsuyuki Oyamada, Sakai (JP); Satoshi Kuzuhara, Sakai (JP); Hisanobu Kitaguchi, Sakai (JP); Keiji Ebata, Osaka (JP)

(73) Assignees: Osaka Prefecture University Public Corporation, Sakai-shi (JP); Sumitomo Electric Industries, Ltd., Osaka-shi (JP)

( * ) Notice: Subject to any disclaimer, the term of this patent is extended or adjusted under 35 U.S.C. 154(b) by 178 days.

(21) Appl. No.: 13/992,576

(22) PCT Filed: Dec. 8, 2011

(86) PCT No.: PCT/JP2011/078485
§ 371 (c)(1),
(2), (4) Date: Jul. 24, 2013

(87) PCT Pub. No.: WO2012/077769
PCT Pub. Date: Jun. 14, 2012

(65) Prior Publication Data
US 2013/0293945 A1 Nov. 7, 2013

(30) Foreign Application Priority Data
Dec. 9, 2010 (JP) ................................ 2010-275013

(51) Int. Cl.
*G02F 1/35* (2006.01)
*H01S 3/10* (2006.01)

(52) U.S. Cl.
CPC .......... *G02F 1/3534* (2013.01); *G02F 2203/13* (2013.01)

(58) Field of Classification Search
USPC ...................................... 359/326; 372/21, 22
See application file for complete search history.

(56) References Cited

U.S. PATENT DOCUMENTS

| 8,254,415 B2* | 8/2012 | Mizuuchi et al. .................. 372/5 |
| 2010/0135344 A1* | 6/2010 | Barnes et al. .................... 372/22 |
| 2013/0100973 A1* | 4/2013 | Bondu et al. .................... 372/28 |

FOREIGN PATENT DOCUMENTS

| JP | 2004-279604 A | 10/2004 |
| JP | 2008-170582 A | 7/2008 |
| WO | WO-2011/001521 A1 | 1/2011 |

OTHER PUBLICATIONS

Wei Shi et al., "A monochromatic and high-power terahertz source tunable in the ranges of 2.7-38.4 and 58.2-3540 μm for variety of potential applications," Applied Physics Letters, vol. 84, No. 10, 2004, pp. 1635-1637.

(Continued)

*Primary Examiner* — Hemang Sanghavi
(74) *Attorney, Agent, or Firm* — Venable LLP; Michael A. Sartori

(57) ABSTRACT

A terahertz light generation device 1 comprises a resonator structure 12 for intensifying incident light and outputting the intensified light and laser oscillation units 10, 11 for feeding the incident light into the resonator structure 12. The incident light comprises first and second incident light components having polarization states different from each other and frequencies different from each other. The laser oscillation units 10, 11 feed the resonator structure 12 with the first and second incident light components at an angle inclined from a principal surface in the resonator structure 12. The resonator structure 12 outputs light having a frequency corresponding to the difference between the respective frequencies of the first and second incident light components.

21 Claims, 31 Drawing Sheets

(56) References Cited

OTHER PUBLICATIONS

K.L. Vodopyanov et al., "Terahertz-wave generation in quasi-phase-matched GaAs," Applied Physics Letters, 89, 2006, pp. 141119-1-141119-3.

Christoph Walther et al., "Quantum cascade lasers operating from 1.2 to 1.6 THz," Applied Physics Letters, 91, 2007, pp. 131122-1-131122-3.

Francis Hindle et al., "Continuous-wave terahertz by photomixing: applications to gas phase pollutant detection and quantification," C.R. Physique, 9, 2008, pp. 262-275.

J. Talghader et al., "Thermal dependence of the refractive index of GaAs and AlAs measured using semiconductor multilayer optical cavities," Applied Physics Letters, vol. 66, No. 3, 1995, pp. 335-337.

Joseph E. Schaar et al., "Terahertz Sources Based on Intracavity Parametric Down-Conversion in Quasi-Phase-Matched Gallium Arsenide," IEEE Journal of Selected Topics in Quantum Electronics, vol. 14, No. 2, 2008, pp. 354-362.

Eliot B. Petersen et al., "Efficient parametric terahertz generation in quasi-phase-matched GaP through cavity enhanced difference-frequency generation," Applied Physics Letters, 98, 2011, pp. 121119-1-121119-3.

Mikhail A. Belkin et al., "Room temperature terahertz quantum cascade laser source based on intracavity difference-frequency generation," Applied Physics Letters, 92, 2008, pp. 201101-1201101-3.

Takahiro Kitada et al., "GaAs/AlAs coupled multilayer cavity structures for terahertz emission devices," Applied Physics Letters, vol. 95, No. 11, 2009, pp. 111106-1-111106-3.

International Preliminary Report on Patentability in International Application No. PCT/JP2011/078485, dated Jun. 20, 2013.

* cited by examiner

Fig.29

| Technique | Incident intensity | Output intensity | Conversion efficiency | Frequency -variable region | Element length | Remarks |
|---|---|---|---|---|---|---|
| Second Embodiment | 3W | 53 μW | $1.7 \times 10^{-5}$ | 0~3THz | 18 μm | CW |
| GaAs quasi-phase matching | 8.5W | 1mW | $1.2 \times 10^{-4}$ | 0.4~3.5THz | 2m with cavity | ps pulse |
| GaP quasi-phase matching | 1.4W | 339 μW | $2.43 \times 10^{-4}$ | 1.5THz | 0.65m with cavity | ns pulse |

LIGHT GENERATION DEVICE AND LIGHT GENERATION METHOD

TECHNICAL FIELD

The present invention relates to a light generation device and a light generation method.

BACKGROUND ART

As studies on light having a desirable frequency, those of light sources in terahertz regions in particular have actively been under way in recent years. Terahertz waves are considered applicable to various physical property measurements utilizing spectroscopy and imaging techniques employing characteristics of the terahertz waves, and their field of application has been extending over a very wide range of industry, medicine, agriculture, biotechnology, security, and the like. Therefore, much attention has been focused on how to improve techniques for generating the terahertz waves. For example, as methods for generating terahertz waves by using nonlinear optical crystals, various methods such as those utilizing birefringence (see, for example, the following Non Patent Literature 1), quasi-phase matching (see, for example, the following Non Patent Literature 2), double resonator (see, for example, the following Non Patent Literature 3), and parametric oscillation have been proposed.

CITATION LIST

Non Patent Literature

Non Patent Literature 1: W. Shi and Y. J. Ding, Appl. Phys. Lett. 84, 2004, Number 10
Non Patent Literature 2: K. L. Vodopyanov and M. N. Fejer et al., Appl. Phys. Lett. 89, 14119, 2006
Non Patent Literature 3: Kitada et al., Appl. Phys. Lett. 95, 111106, 2009
Non Patent Literature 4: Christoph Walther, et al. "Quantum cascade lasers operating from 1.2 to 1.6 THz," Appl. Phys. Lett. 91, 131122, 2007
Non Patent Literature 5: F. Hindle et al., C. R. Physique 9, 262-275, 2008

SUMMARY OF INVENTION

Technical Problem

However, the conventional techniques exemplified by the above-mentioned Non Patent Literatures 1 to 3 are not considered realistic as methods for generating light having a desirable frequency, since they mostly use laser light having a high intensity on the order of $GW/cm^2$ as a pumping light source, employ pulsed light which is hard to narrow its linewidth, make a device bulky in principle, or yield a low efficiency in light generation.

As mentioned above, all of the conventional techniques exemplified by the above-mentioned Non Patent Literatures 1 to 3 use pulsed light for pumping light sources, and none of them is evaluated as a continuous light source. Continuous light is superior to pulsed light in spectral resolution of frequency regions. Therefore, light sources for continuous light are demanded in the market, though those satisfying market demands such as frequency-variable regions, generation intensity, and smaller size are few. While a cascade laser (see, for example, the above-mentioned Non Patent Literature 4) and a photomixing technique (see, for example, the above-mentioned Non Patent Literature 5) have been known as continuous light sources, the former and latter operate at low temperature and yield output on the order of 100 nW or less, respectively, in a THz frequency band, in particular in the range of 0.5 to 3.0 THz required for detecting fingerprint spectra. The latter also lowers its output as the frequency increases, so that the output is 1 nW or less at 2 THz or higher. Though the latter can enhance the generation intensity by increasing the incident light intensity, electrode parts thermally break at a given incident light intensity or higher, which poses an upper limit for improving the output intensity by increasing the incident light intensity.

In view of the above, it is an object of the present invention to provide a light generation device and light generation method which can efficiently generate light having a desirable frequency.

Solution to Problem

For achieving the above-mentioned object, the light generation device of the present invention comprises a resonator structure for intensifying incident light and outputting the intensified light and an input unit for inputting the incident light into the resonator structure; wherein the incident light comprises first and second incident light components having polarization states different from each other and frequencies different from each other; wherein the input unit inputs the first and second incident light components at an angle inclined from a direction perpendicular to a principal surface in the resonator structure; and wherein the resonator structure outputs light having a frequency corresponding to a difference between the respective frequencies of the first and second incident light components.

For achieving the above-mentioned object, the light generation method of the present invention comprises, in a light generation device comprising a resonator structure for intensifying incident light and outputting the intensified light and an input unit for inputting the incident light into the resonator structure, the incident light comprising first and second incident light components having polarization states different from each other and frequencies different from each other, inputting, by the input unit, the first and second incident light components at an angle inclined from a direction perpendicular to a principal surface in the resonator structure and outputting, by the resonator structure, light having a frequency corresponding to a difference between the respective frequencies of the first and second incident light component.

In thus constructed light generation device and light generation method, the light generation device comprises a resonator structure and an input unit; when the input unit inputs first and second incident light components at an angle with a principal surface in the resonator structure, the resonator structure outputs light having a frequency corresponding to a difference between the respective frequencies of the first and second incident light components as output light. Here, the two incident light components have polarization states different from each other; for example, the first and second incident light components have s- and p-polarized states, respectively. The first and second incident light components may have p- and s-polarized states, respectively. The two incident light components have respective frequencies different from each other; preferably, the s- and p-polarized incident light components have frequencies coinciding with resonance frequencies of s- and p-polarized light components corresponding to the inclination angle of the input unit, respectively. By the resonance frequency is meant herein a frequency which can generate a resonator mode, and is not limited to one frequency value but may be a frequency band having some width which generates the resonator mode. In the foregoing light generation device and light generation method of the present invention, the input unit inputs the incident light with an angle, whereby a shift occurs in the resonance frequency of the resonator structure for differently polarized light components. This is considered to be a phenomenon occurring because of structural birefringence caused by a periodic thin film structure and attributable to the fact that the effective refractive index is changed by polarization. Then, light having a frequency corresponding to the shift is issued as output light. Therefore, light having a desirable frequency to be produced can be generated when the input unit adjusts the incidence angle according to the desirable frequency to be produced. That is, the present invention provides a frequency-variable light generation device and light generation method. The device and method can also improve the efficiency in light generation and reduce the size of the device as a whole.

The present invention may further comprise a temperature regulation unit for controlling the resonance frequencies of the s- and p-polarized light components by regulating a temperature of the resonator structure.

In this case, regulating the temperature of the resonator structure can control the resonance frequencies of the s- and p-polarized light components, so that one of the resonance frequencies becomes constant. The temperature regulation is considered to be a relatively easy control technique and thus can improve the convenience of the device structure.

In the present invention, the resonator structure may be a simple resonator structure comprising a defect layer constituted by a GaAs layer and a reflector constituted by a multi-layer comprising GaAs and AlAs layers.

In the present invention, the resonator structure may be a composite photonic crystal structure comprising a photonic crystal constituted by a multilayer comprising active and inactive layers respectively made of GaAs and AlAs layers and a reflector constituted by a multilayer comprising GaAs and AlAs layers.

In the present invention, the resonator structure may be a simple photonic crystal structure comprising a photonic crystal constituted by a multilayer comprising active and inactive layers respectively made of GaAs and AlAs layers.

These represent specific techniques for constructing the resonator structure in the present invention.

In the present invention, the GaAs and AlAs layers in the reflector in the composite photonic crystal structure may have respective thicknesses different from each other. Here, for example, the effective thickness ratio of the GaAs layer to the AlAs layer=1:1 in the photonic crystal and 1:4 in the reflector, so that the photonic crystal and reflector may have effective thickness ratios different from each other.

These can further improve the efficiency in light generation and further reduce the size of the device as a whole.

In the present invention, the resonator structure may output light having a frequency corresponding to the difference between the respective resonance frequencies of the s- and p-polarized light components having different values as a result of structural birefringence caused by the input unit inputting the first and second incident light components at the inclined angle.

Advantageous Effects of Invention

The present invention can provide a light generation device and light generation method which can efficiently generate light having a desirable frequency.

BRIEF DESCRIPTION OF DRAWINGS

FIG. 29 is a chart for illustrating comparisons of performances between the second embodiment and other techniques;

DESCRIPTION OF EMBODIMENTS

In the following, preferred embodiments of the light generation device and light generation method in accordance with the present invention will be explained in detail with reference to the accompanying drawings. In the explanation of the drawings, the same constituents will be referred to with the same signs while omitting their overlapping descriptions.

First Embodiment

Overall Structure of a Terahertz Light Generation Device 1

Figure 1:
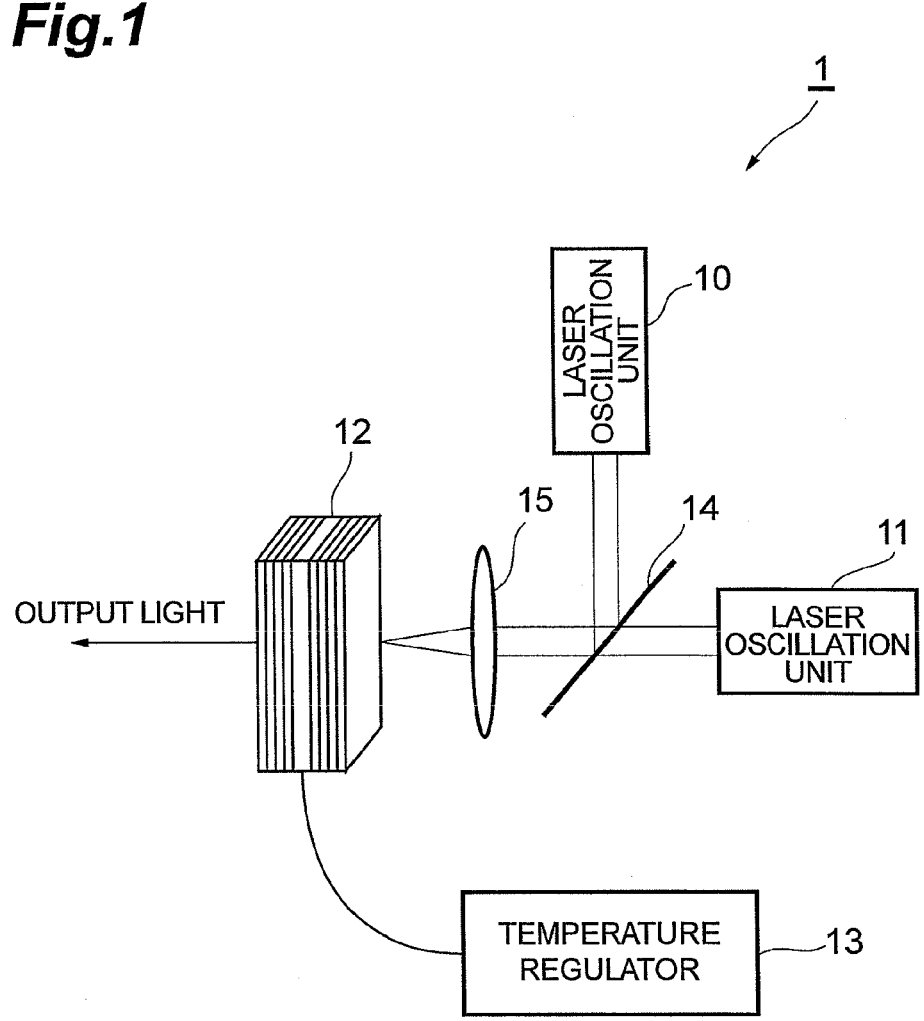
FIG. 1 is a schematic structural diagram of a terahertz light generation device 1.

To begin with, the structure of the terahertz light generation device 1 (corresponding to the "light generation device" in claims) in accordance with the first embodiment of the present invention will be explained with reference to FIG. 1. FIG. 1 is a schematic structural diagram of the terahertz light generation device 1. As illustrated in FIG. 1, the terahertz light generation device 1 mainly comprises laser oscillation units 10, 11 (corresponding to the "input unit" in claims), a resonator structure 12, and a temperature regulator 13 (corresponding to the "temperature regulation unit" in the claims). The laser oscillation units 10, 11 feed the resonator structure 12 with incident light through a mirror 14 and a lens 15. The resonator structure 12 intensifies the incident light fed from the laser oscillation units 10, 11 and outputs thus intensified light as output light.

The light incident on the resonator structure 12 from the laser oscillation units 10, 11 comprises two incident light components, i.e., first and second incident light components. The two incident light components have polarization states different from each other; for example, the first and second incident light components may have s- and p-polarized states, respectively, or vice versa. In the first embodiment, it is assumed that the first and second incident light components having the s- and p-polarized states are made incident on the resonator structure 12 by the laser oscillation units 10, 11, respectively.

Figure 2:
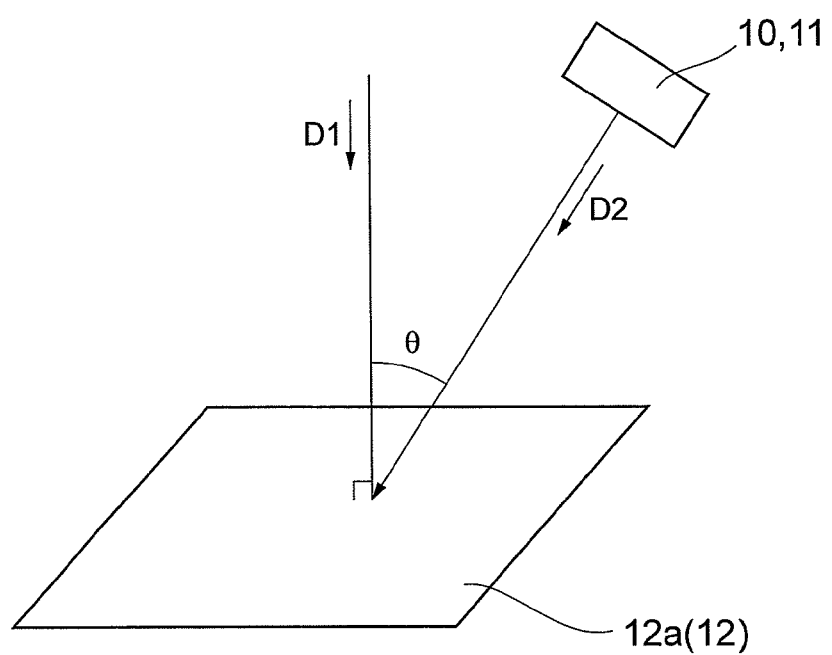
FIG. 2 is a diagram imaging how laser oscillation units 10, 11 feed a resonator structure 12 with first and second incident light components at an angle.

The laser oscillation units 10, 11 feed the resonator structure 12 with the first and second incident light components at an angle inclined from a direction perpendicular to a principal surface in the resonator structure 12. FIG. 2 images how the laser oscillation units 10, 11 feed the resonator structure 12 with the first and second incident light components at an angle. The laser oscillation units 10, 11 feed the resonator structure 12 with the first and second incident light components in a direction D2 which is inclined by an angle θ from a direction D1 which is perpendicular to a principal surface 12a in the resonator structure 12. In the first embodiment, the laser oscillation units 10, 11 make the first and second incident light components incident obliquely at the same angle, while adjusting the inclination angle θ within the range of 0° to 90°.

Figure 3:
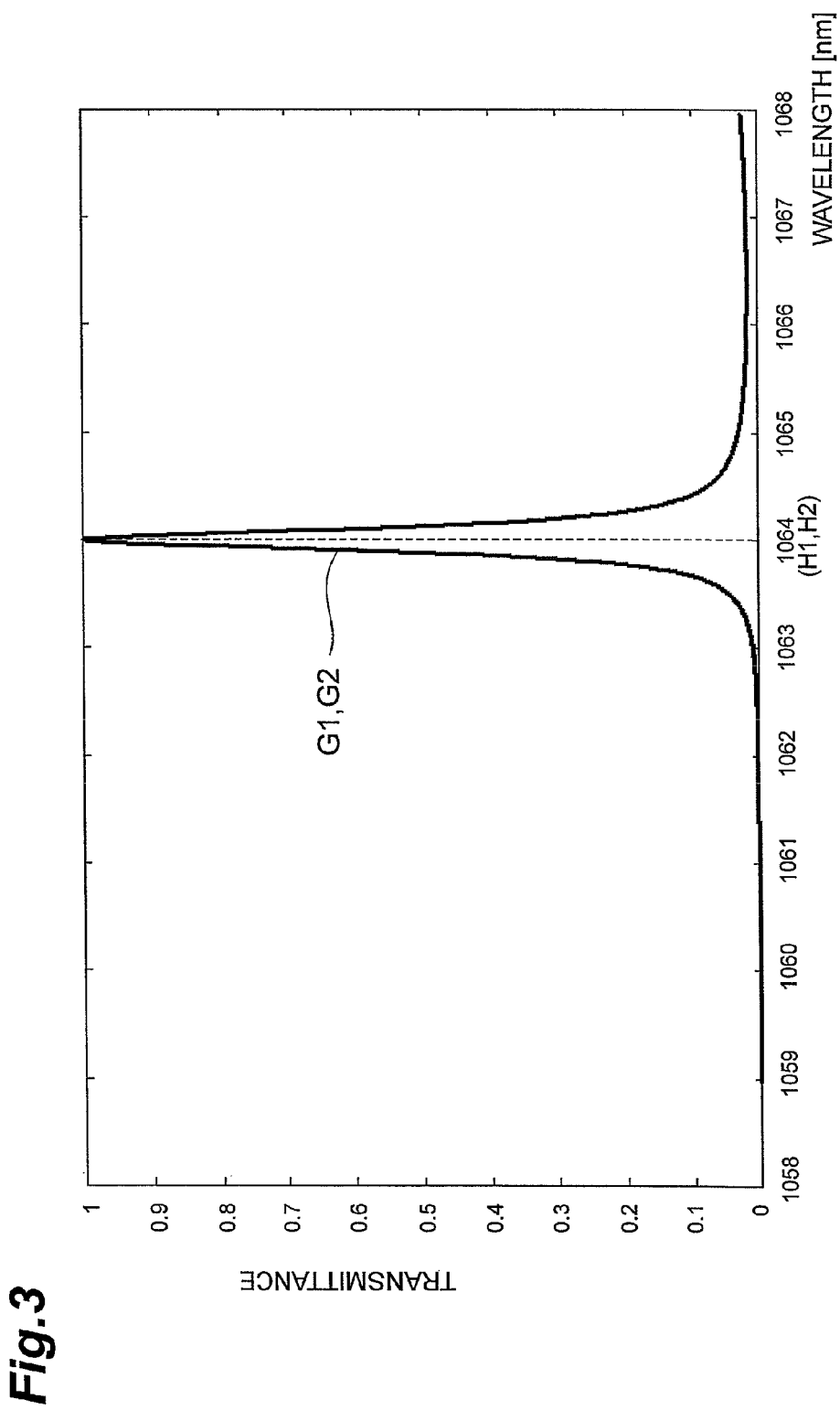
FIG. 3 is a chart for explaining the fact that a shift occurs in a frequency generating a resonator mode when the laser oscillation units 10, 11 feed the resonator structure 12 with the first and second incident light components respectively in the s- and p-polarized states at an angle.
Figure 4:
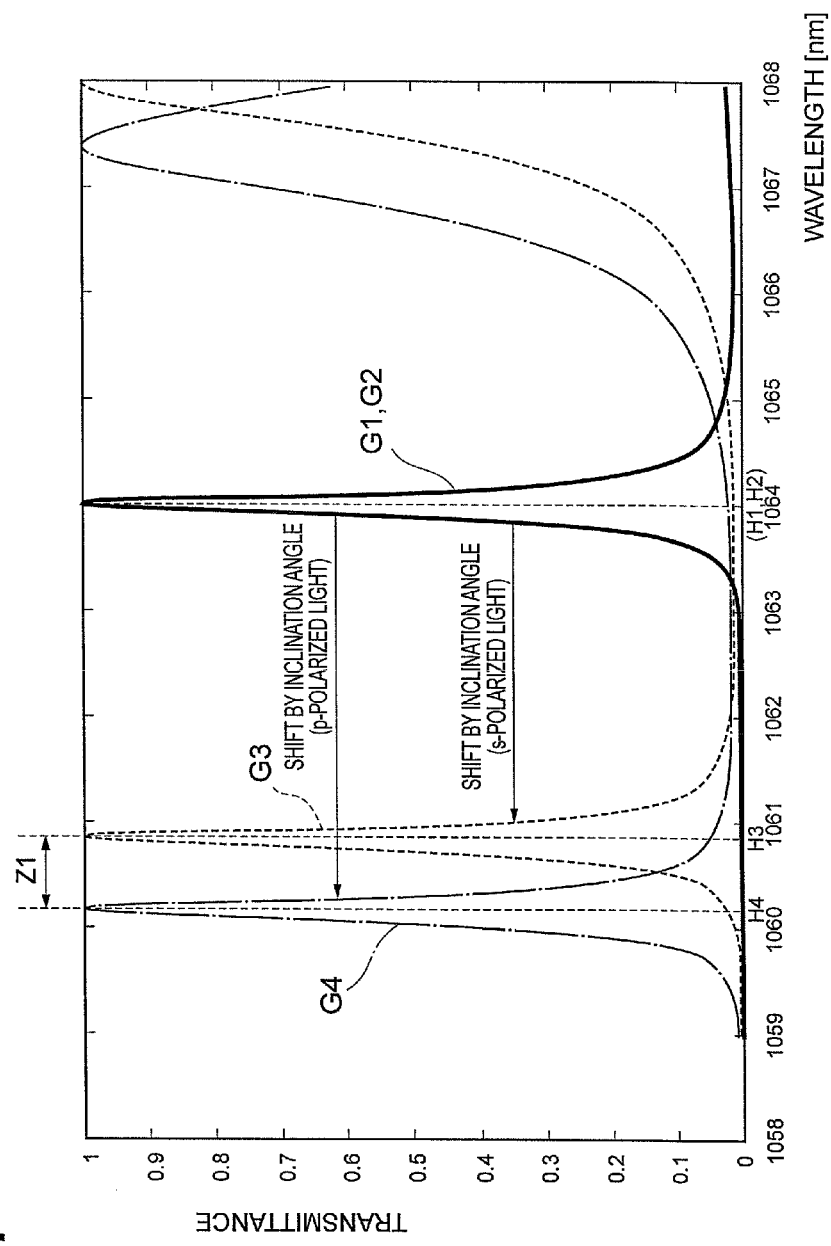
FIG. 4 is a chart for explaining the fact that a shift occurs in the frequency generating a resonator mode when the laser oscillation units 10, 11 feed the resonator structure 12 with the first and second incident light components respectively in the s- and p-polarized states.

When the laser oscillation units 10, 11 feed the resonator structure 12 with the first and second incident light components respectively in the s- and p-polarized states at an angle, a shift occurs in a frequency which generates a resonator mode (hereinafter also referred to as "resonance frequency"; the resonance frequency is not limited to one frequency value but may be a frequency band having some width which generates the resonator mode). FIGS. 3 and 4 image this as transmittance vs. wavelength. In FIG. 3, graphs G1 and G2 represent respective cases where the laser oscillation units 10, 11 feed the resonator structure 12 with the first and second incident light components respectively in the s- and p-polarized states perpendicular to the principal surface 12a therein. The resonance frequency in the graph G1 of the s-polarized first incident light component is a frequency corresponding to a wavelength H1 (e.g., 1064 nm), while the resonance frequency in the graph G2 of the p-polarized second incident light component is a frequency corresponding to a wavelength H2 (e.g., 1064 nm). In FIG. 4, graphs G3 and G4 represent respective cases where the laser oscillation units 10, 11 feed the resonator structure 12 with the first and second incident light components respectively in the s- and p-polarized states at an angle of 15° with the principal surface 12a therein. The resonance frequency in the graph G3 of the s-polarized first incident light component is a frequency corresponding to a wavelength H3, while the resonance frequency in the graph G4 of the p-polarized second incident light component is a frequency corresponding to a wavelength H4. In the perpendicular incidence, no shift in resonance frequency occurs between the s- and p-polarized light components as illustrated in FIG. 3. That is, the wavelengths H1 and H2 coincide with each other. Hence, FIG. 3 represents the graphs G1 and G2 superimposed on each other. In the oblique incidence at 15°, on the other hand, a shift occurs in resonance frequency, which is represented by Z1 in FIG. 4. FIG. 4 illustrates that the graph G3 has shifted from the graph G1, thereby moving the wavelength of resonance frequency from the wavelength H1 to the wavelength H3 and that the graph G4 has shifted from the graph G2, thereby moving the wavelength of resonance frequency from the wavelength H2 to the wavelength H4. FIGS. 3 and 4 are respective cases where the incidence angle θ is 0° and 15° while employing a simple photonic crystal 123 as the resonator structure 12 in Structural Example 3 which will be explained later. As will be explained in the following, the output light of the terahertz light generation device 1 in the first embodiment has a frequency corresponding to the shift Z1 illustrated in FIG. 4 unless temperature regulation which will be described later is performed.

Figure 5:
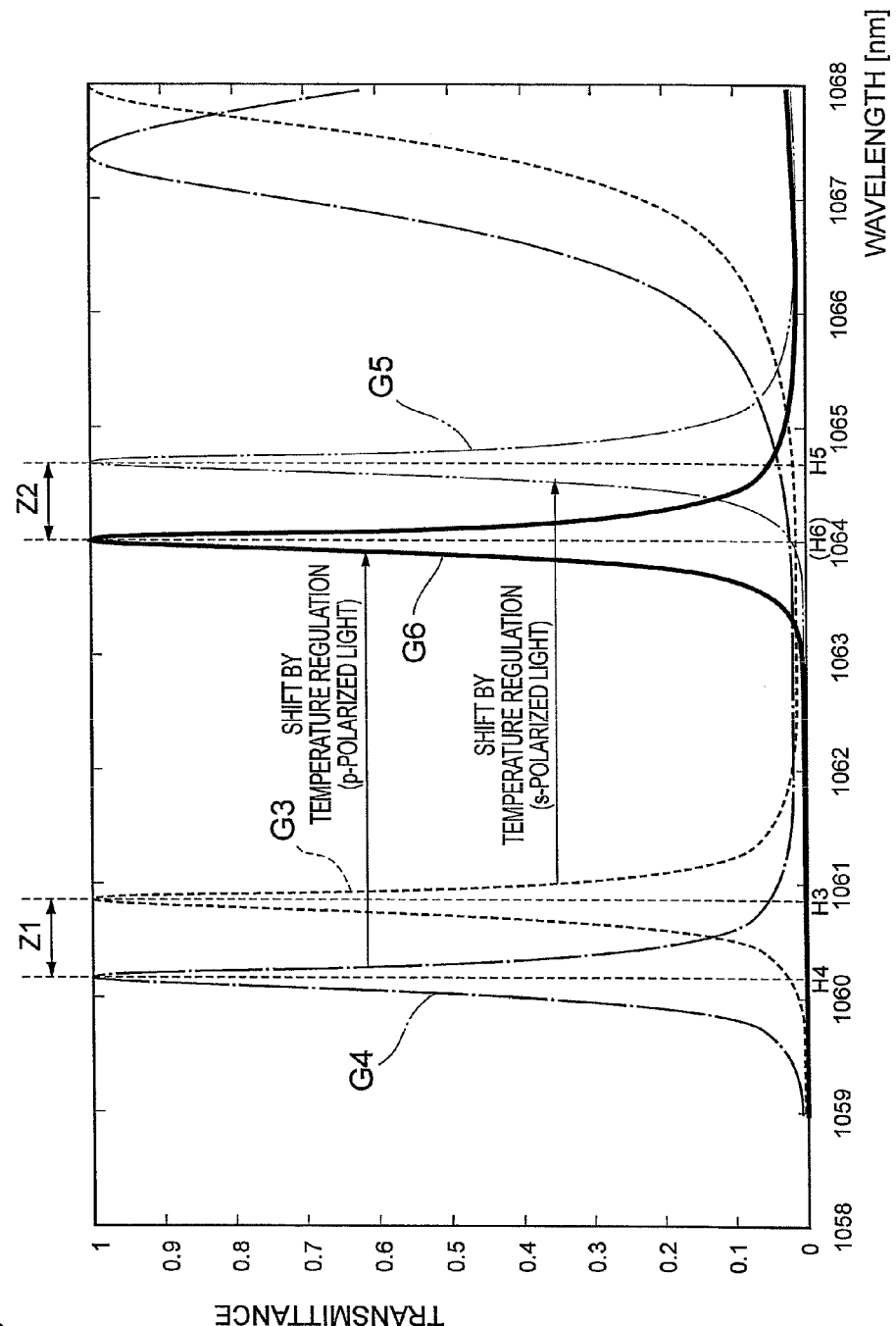
FIG. 5 is a chart illustrating how a change occurs in the shifted resonance frequency under temperature regulation.

The two incident light components fed to the resonator structure 12 by the laser oscillation units 10, 11 have respective frequencies different from each other. For example, the frequency of the s-polarized first incident light component coincides with the resonance frequency of s-polarized light corresponding to the inclination angle θ of the laser oscillation unit 10, while the frequency of the p-polarized second incident light component coincides with the resonance frequency of p-polarized light corresponding to the inclination angle θ of the laser oscillation unit 11. Specifically, in the oblique incidence at 15° in the example of FIG. 4, the transmittance for s-polarized light reaches its peak at the wavelength H3, whereby the s-polarized first incident light component has a frequency corresponding to the wavelength H3. The transmittance for p-polarized light reaches its peak at the wavelength H4, whereby the p-polarized second incident light component has a frequency corresponding to the wavelength H4. In the oblique incidence at 15° in Structural Examples 1 to 3 which will be explained later, the wavelength H4 was 1060.85 nm in the simple resonator of Structural Example 1, 1060.4 nm in the composite photonic crystal of Structural Example 2, and 1060.15 nm in the simple photonic crystal of Structural Example 3. In practice, however, temperature regulation which will be explained later is performed for the convenience of the device design so that the s-polarized first incident light component and p-polarized second incident light component have frequencies corresponding to the wavelengths H5 and H6 (e.g., 1064 nm) illustrated in FIG. 5, respectively. FIG. 5 is a chart illustrating how a change occurs in the resonance frequency under temperature regulation in the situation of FIG. 4. Letting v1 (the frequency corresponding to the wavelength H5) be the frequency of the s-polarized first incident light component, and v2 (the frequency corresponding to the wavelength H6) be the frequency of the p-polarized second incident light component, the frequency of output light is their difference |v1−v2|.

The temperature regulator 13 will now be explained in detail. When the incidence angle θ is made greater, the frequency of the resonator mode shifts to the high frequency side. The above-mentioned FIGS. 3 and 4 represent this fact. Therefore, in order to return the shifted resonance frequency to the original resonance frequency, the temperature regulator 13 performs temperature regulation for the resonator structure 12, so as to control its refractive index. This controls the respective resonance frequencies of the s- and p-polarized first and second incident light components so that one of the resonance frequencies becomes constant. In the first embodiment, the resonance frequency of the p-polarized second incident light component is controlled so as to return to the resonance frequency in the state where the incidence angle is zero (in the perpendicular incidence state) and become constant. FIG. 5 images this with arrows, so that the resonance frequency of the s-polarized first incident light component changes from the wavelength H3 to the wavelength H5 after the temperature regulation. The temperature regulation also changes the resonance frequency of the p-polarized second incident light component (the frequency corresponding to the wavelength H4) to the wavelength H6. Here, the wavelength H6 is a wavelength coinciding with or near the resonance frequency at the time of perpendicular incidence (frequencies corresponding to the wavelengths H1 and H2; see FIGS. 3 and 4). After such temperature regulation, the difference in frequency corresponding to the difference in wavelength represented by Z2 in FIG. 5 becomes the frequency of the output light of the terahertz light generation device 1 in the first embodiment. When no temperature regulation is performed, the difference in frequency corresponding to the difference in wavelength represented by Z1 in FIGS. 4 and 5 becomes the frequency of the output light of the terahertz light generation device 1 in the first embodiment as mentioned above.

The range of temperature regulation at this time is 220 K to 390 K, for example. The range of temperature regulation varies depending on the resonator structure in use, i.e., the number of films, film thicknesses, and materials in the resonator structure. The following expressions (1) and (2) illustrate temperature dependences of refractive index. The expression (1) illustrates the temperature dependence of refractive index at a part constituted by GaAs in the case where the resonator structure 12 includes the part constituted by GaAs. The expression (2) illustrates the temperature dependence of refractive index at a part constituted by AlAs in the case where the resonator structure 12 includes the part constituted by AlAs. In the expressions (1) and (2), n and T indicate the refractive index and the temperature of the resonator structure 12, respectively.

[Math. 1]
$$\left(\frac{dn}{dT}\right)_{GaAs} = 2.67 \times 10^{-4} [1/K] \tag{1}$$

[Math. 2]
$$\left(\frac{dn}{dT}\right)_{AlAs} = 1.43 \times 10^{-4} [1/K] \tag{2}$$

The following Reference Literature 1 is one concerning a technique for performing frequency control under temperature regulation.

Reference Literature 1: J. Talghader and J. S. Smith, Appl. Phys. Lett. 66, 335, 1995

Returning to FIG. 1, the resonator structure 12 inputs thereto the s-polarized first incident light component having the frequency v1 as signal light and the p-polarized second incident light component having the frequency v2 as pumping light from the laser oscillation units 10, 11, respectively, and issues output light having a frequency corresponding to the difference between the respective frequencies of the incident light components, i.e., |v1−v2|, as idler light. That is, the laser oscillation units 10, 11 feed the resonator structure 12 with the s-polarized first incident light component as signal light and the p-polarized second incident light component as pumping light at the inclined angle θ, so as to cause structural birefringence, whereby the resonator structure 12 outputs light having a frequency corresponding to the difference between the respective resonance frequencies of the s- and p-polarized light components resultantly having different values. In the first embodiment, the resonator structure 12 outputs light in a terahertz region as idler light according to the following Structural Examples 1 to 3.

The structural examples of the terahertz light generation device 1 in the first embodiment utilizing a plurality of kinds of resonator structure 12 will now be explained.

Structural Example 1

Figure 6:
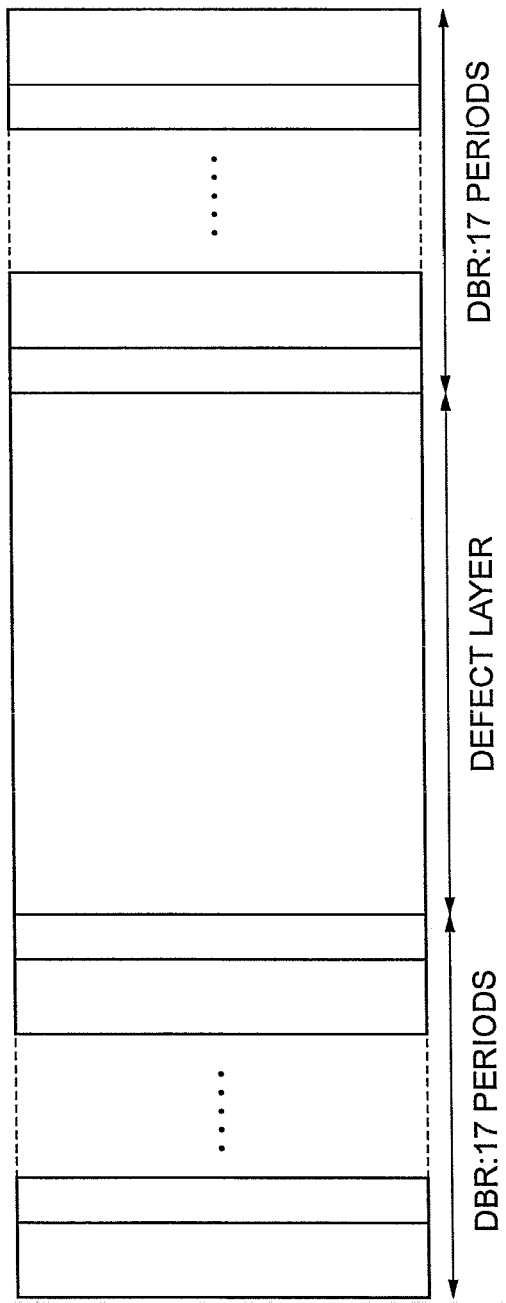
FIG. 6 is a conceptual diagram of a simple resonator 121 employed as the resonator structure 12 in Structural Example 1.

The first structural example relates to a case employing a simple resonator as the resonator structure 12. FIG. 6 is a conceptual diagram of the simple resonator 121 in this case. As illustrated in FIG. 6, the simple resonator 121 has a structure comprising a defect layer constituted by a GaAs layer and a reflector (DBR: Distributed Bragg Reflector) constituted by a multilayer composed of GaAs and AlAs layers.

Figure 7:
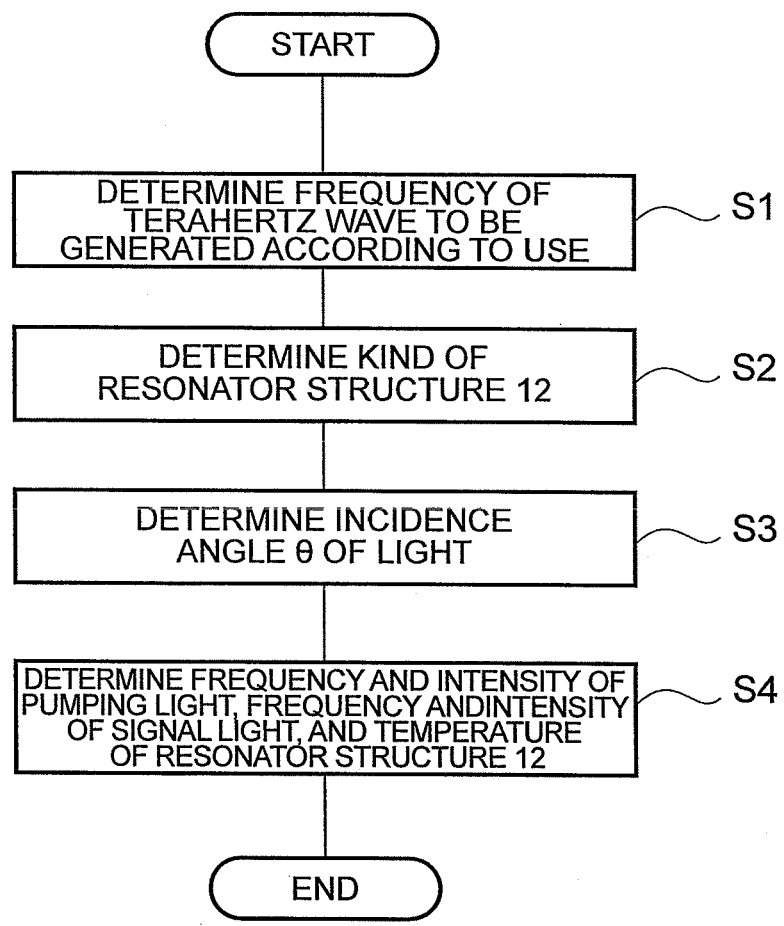
FIG. 7 is a flowchart illustrating a procedure of generating output light in a desirable terahertz region by using the terahertz light generation device 1.

Parameters in the simple resonator 121 are listed in the following.
1. GaAs layers in the DBR
Film thickness: 99.09 nm
Number of layers: 17
Refractive index: 3.588 (wavelength: 1064 nm)
2. AlAs layers in the DBR
Film thickness: 65.73 nm
Number of layers: 17
Refractive index: 2.989 (wavelength: 1064 nm)
3. GaAs layers in the Defect Layer
Film thickness: 2391.7 nm
Number of layers: 1
Refractive index: 3.588 (wavelength: 1064 nm)
4. Number of periods in the DBR: 17 each in the front and rear, 34 periods in total
5. Total crystal length: 7995.24 nm The flowchart of FIG. 7 illustrates a procedure of generating output light in a desirable terahertz region by using the terahertz light generation device 1 equipped with thus constructed simple resonator 121. First, a wavelength of a terahertz wave to be generated is determined according to its use (step S1). Subsequently, the kind of resonator structure 12 is determined (step S2). The simple resonator 121 is assumed to be chosen in this structural example.

Figure 8:
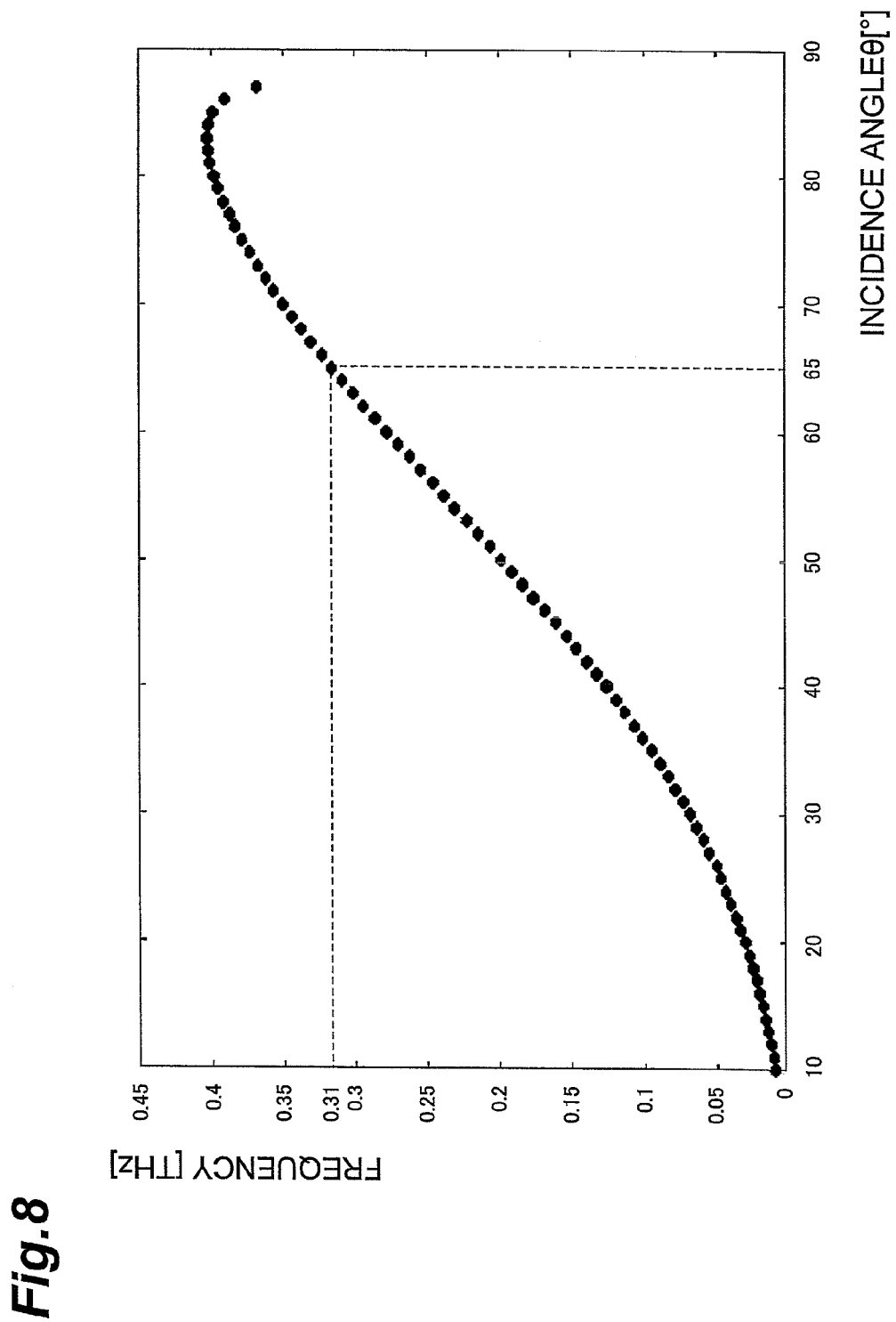
FIG. 8 is a chart illustrating the relationship between incidence angle θ and frequency of light to be generated in Structural Example 1.

Next, the incidence angle θ of the s-polarized first incident light component (signal light) and p-polarized second incident light component (pumping light) is determined according to the frequency of the terahertz wave to be generated (step S3). The incidence angle θ is determined by the frequency of light to be generated; FIG. 8 illustrates the relationship between the incidence angle θ and the frequency of light to be generated when the simple resonator 121 is chosen as the resonator structure 12. When light at 0.31 THz is to be generated, for example, the incidence angle θ can be set to 65° as illustrated in FIG. 8.

Figure 9:
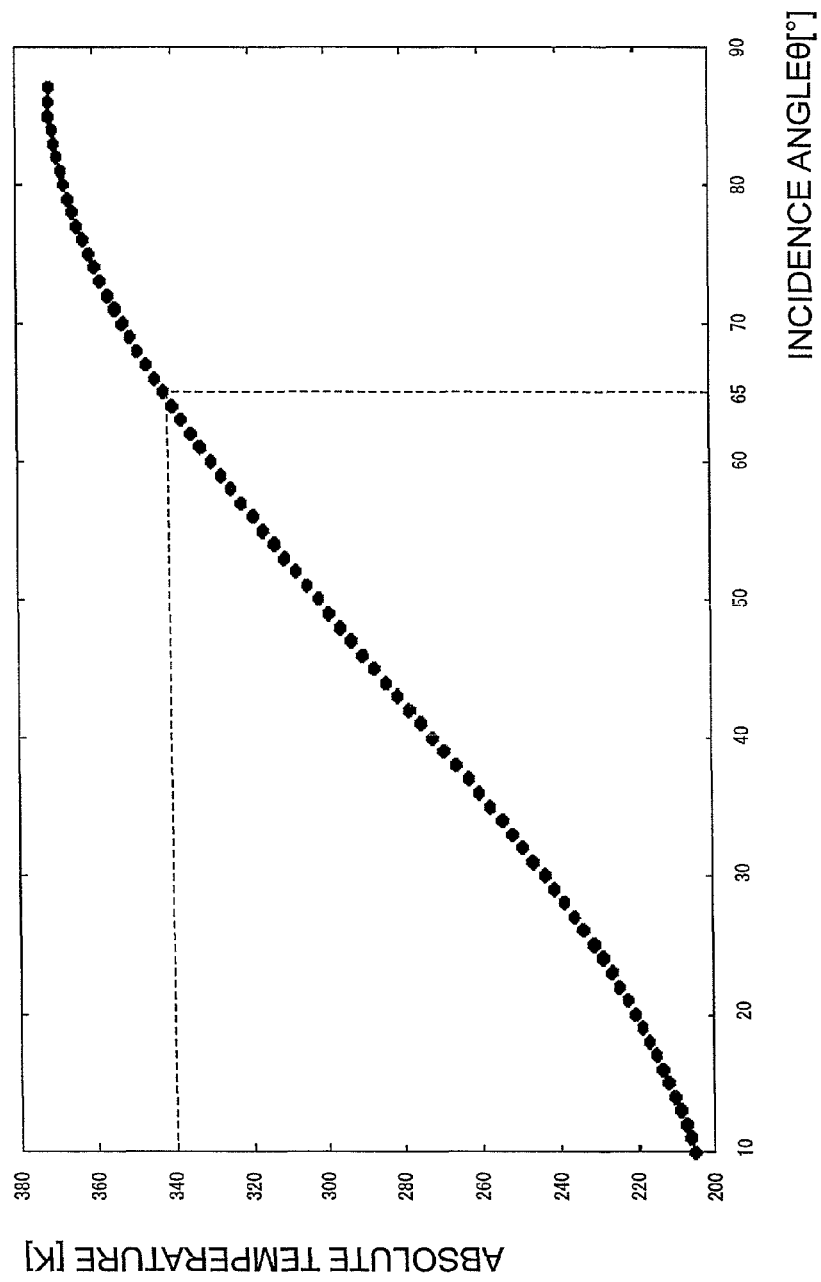
FIG. 9 is a chart illustrating the relationship between the incidence angle θ and temperature in Structural Example 1.

Returning to FIG. 7, as the next process, the frequency and intensity of pumping light, the frequency and intensity of signal light, and the temperature of the simple resonator 121 are determined (step S4). When light at 0.31 THz is to be generated as mentioned above, for example, the frequency of pumping light is kept constant at about 281.95 THz (wavelength: 1064 nm), and its intensity is set to 1 MW/cm$^2$. The intensity is desirably as high as possible in view of conversion efficiency. The frequency of signal light can be determined by 281.95 THz—the difference frequency (the frequency of light to be generated) and thus is set to about 281.64 THz. The intensity of signal light is on a par with or lower than the intensity of pumping light. When the incidence angle θ is set to 65° in order to generate light at 0.31 THz, for example, the temperature of the simple resonator 121 can be set to 340 K as an absolute temperature as illustrated in FIG. 9. The frequency of pumping light is kept constant at about 281.95 THz (wavelength: 1064 nm) as mentioned above under temperature regulation.

Figure 10:
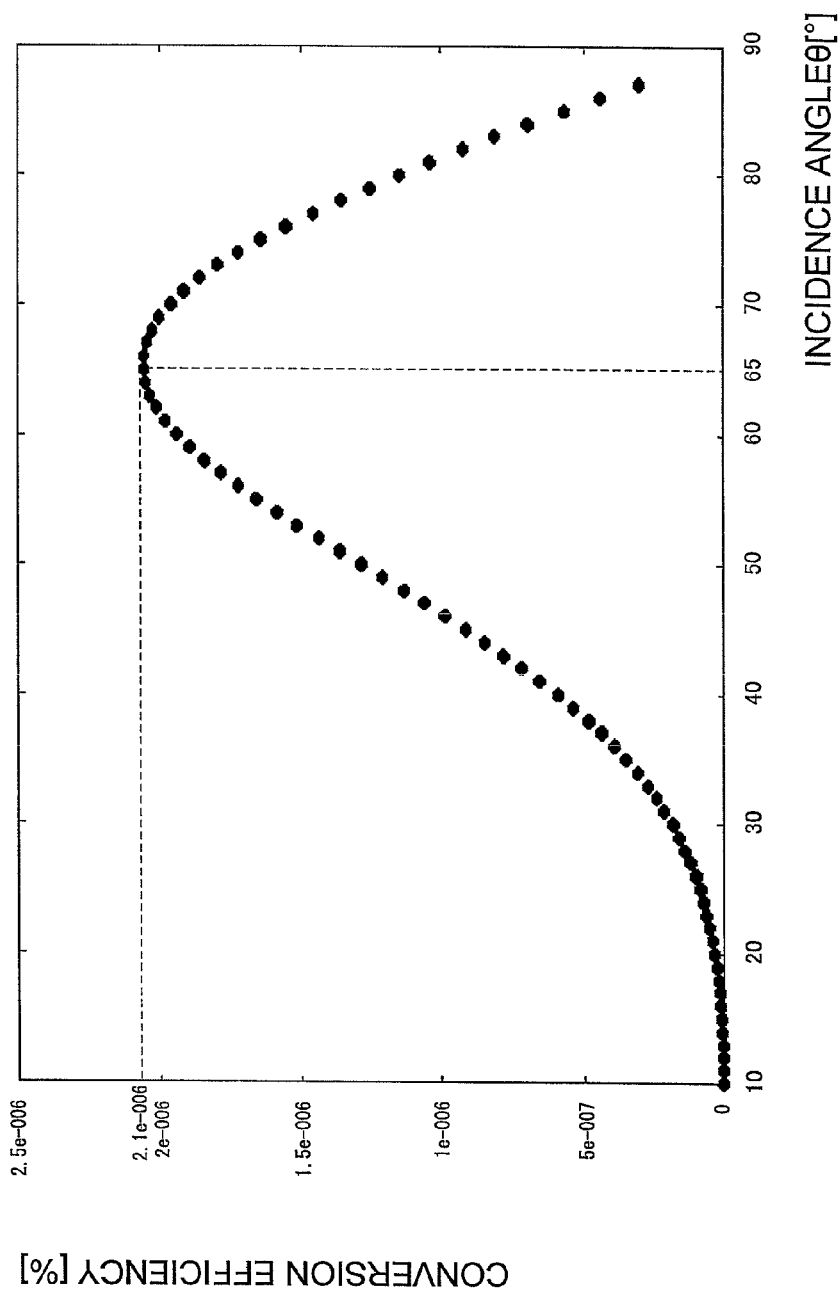
FIG. 10 is a chart illustrating the relationship between the incidence angle θ and conversion efficiency in Structural Example 1.

The foregoing generates desirable light at 0.31 THz. FIG. 10 illustrates the conversion efficiency at this time. As illustrated in FIG. 10, when the incidence angle θ is 65° while the simple resonator 121 is under temperature regulation at 340 K, the conversion efficiency is 2.1 e-006%. In view of results in other frequency ranges, the conversion efficiency rises as the incidence angle θ is made greater, so that the maximum value of conversion efficiency appears in the vicinity of 65°. Though FIG. 10 represents 2.1 e-006% as the maximum conversion efficiency since the confinement effect is weakened in view of performances of readily usable laser light sources at present, a higher conversion efficiency value can be obtained by changing conditions.

Examples of merits in this structural example include: 1. thinness in the device; 2. variable generation frequency; and 3. achievability of a high-output continuous light source. The device, i.e., the resonator structure 12, is thinner by three digits than those conventionally known. Additionally taking account of the fact that the conversion efficiency increases in proportion to the square of the thickness, the device of this structural example can be considered to be one having performances beyond comparison. The device of Non Patent Literature 3, whose structure is totally different from that of this structural example and cannot be compared therewith, seems to be on the same order as with this structural example only in terms of the thickness of the resonator structure. The same literature has not yet reached discussions of conversion efficiency, so that its conversion efficiency cannot be compared with that in the device of this structural example. However, according to the knowledge of the inventors, this structural example seems to be superior to the literature beyond comparison in terms of conversion efficiency when their conditions such as incident light intensity and element thickness are made equivalent to each other.

The fact that the generation frequency and incident light frequency are variable acts very advantageously for applying terahertz waves. This is a capability not found in any of the quasi-phase matching of Non Patent Literature 2 and the double resonator of Non Patent Literature 3, whereby this structural example can be considered a device more suitable for applications than are the techniques of both literatures.

Since the conversion efficiency is proportional to the incident light intensity, pulsed light having a peak-to-peak value higher than that of continuous light yields a higher conversion efficiency value. Therefore, various studies (e.g., the above-mentioned Non Patent Literatures 1 to 3) calculate the conversion efficiency in pulsed light, while the frequency resolution of pulsed light is inferior to that of continuous light and thus has low accuracy when obtaining an absorption spectrum, for example. There are only a very limited number of literatures having tried terahertz generations of continuous light, which compels this specification to perform a comparison with pulsed light. The value of conversion efficiency itself in the first embodiment is inevitably inferior to that in pulsed light.

While the output in photomixing (e.g., the above-mentioned Non Patent Literature 5) decreases in the unit of digits as the frequency becomes higher, the output in the first embodiment does not decrease so much even in the frequency region of 0.5 to 3.0 THz. The linewidth of thus generated terahertz light seems to be on substantially the same order as that of the pumping light or signal light. Though the structural example in the first embodiment assumes a linewidth on the order of GHz, continuous light sources on the order of kHz and MHz are commercially available at present, whereby designs conforming thereto are expected to further raise the conversion efficiency. When fed with light having a linewidth on the order of GHz or less, even the current structural example can generate light having the same order of linewidth. The value of conversion efficiency may become higher than the above-mentioned value depending on structural differences in the resonator structure 12 (differences in the structure itself as will be illustrated by the following Structural Examples 2 and 3 and differences in the growth face).

Structural Example 2

Figure 11:
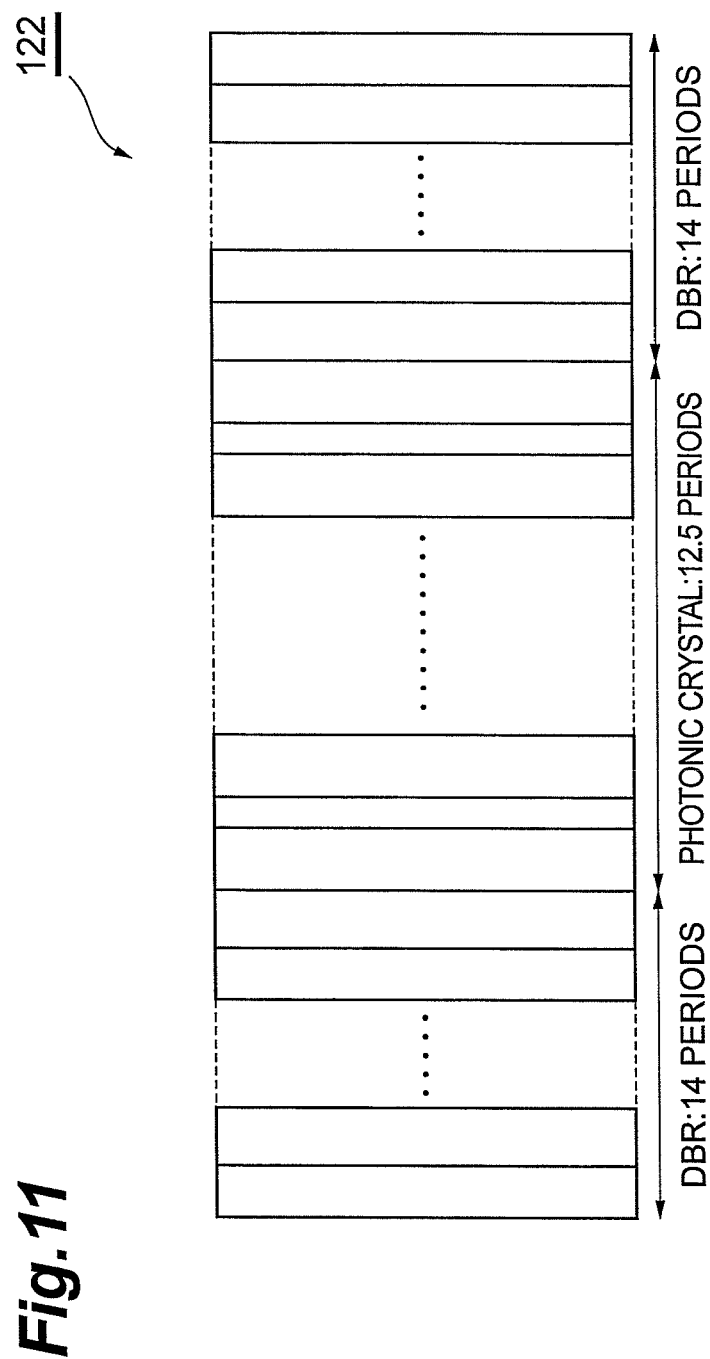
FIG. 11 is a conceptual diagram of a composite photonic crystal structure 122 employed as the resonator structure 12 in Structural Example 2.

The next structural example relates to a case employing a composite photonic crystal structure 122 as the resonator structure 12. FIG. 11 is a conceptual diagram of the composite photonic crystal structure 122 in this case. As illustrated in FIG. 11, the composite photonic crystal structure 122 has a structure comprising a photonic crystal constituted by a multilayer composed of active and inactive layers respectively made of GaAs and AlAs layers and a reflector (DBR) constituted by a multilayer of GaAs and AlAs layers.

Parameters in the composite photonic crystal structure 122 are listed in the following.
1. GaAs layers in the DBR
Film thickness: 79.18 nm
Number of layers: 14
Refractive index: 3.382 (wavelength: 1064 nm; temperature: 200 K)
2. AlAs layers in the DBR
Film thickness: 92.49 nm
Number of layers: 14
Refractive index: 2.895 (wavelength: 1064 nm; temperature: 200 K)
3. GaAs layers in the photonic crystal
Film thickness: 72.53 nm
Number of layers: 13
Refractive index: 3.382 (wavelength: 1064 nm; temperature: 200 K)
4. AlAs layers in the photonic crystal
Film thickness: 84.72 nm
Number of layers: 12
Refractive index: 2.895 (wavelength: 1064 nm; temperature: 200 K)
5. Number of periods in the DBR: 14 each in the front and rear, 28 periods in total
6. Total crystal length: 6766.01 nm The procedure of generating output light in a desirable terahertz region by using the terahertz light generation device 1 equipped with thus constructed composite photonic crystal structure 122 is as illustrated in the flowchart of FIG. 7. First, a wavelength of a terahertz wave to be generated is determined according to its use (step S1). Subsequently, the kind of resonator structure 12 is determined (step S2). The composite photonic crystal structure 122 is assumed to be chosen in this structural example.

Figure 12:
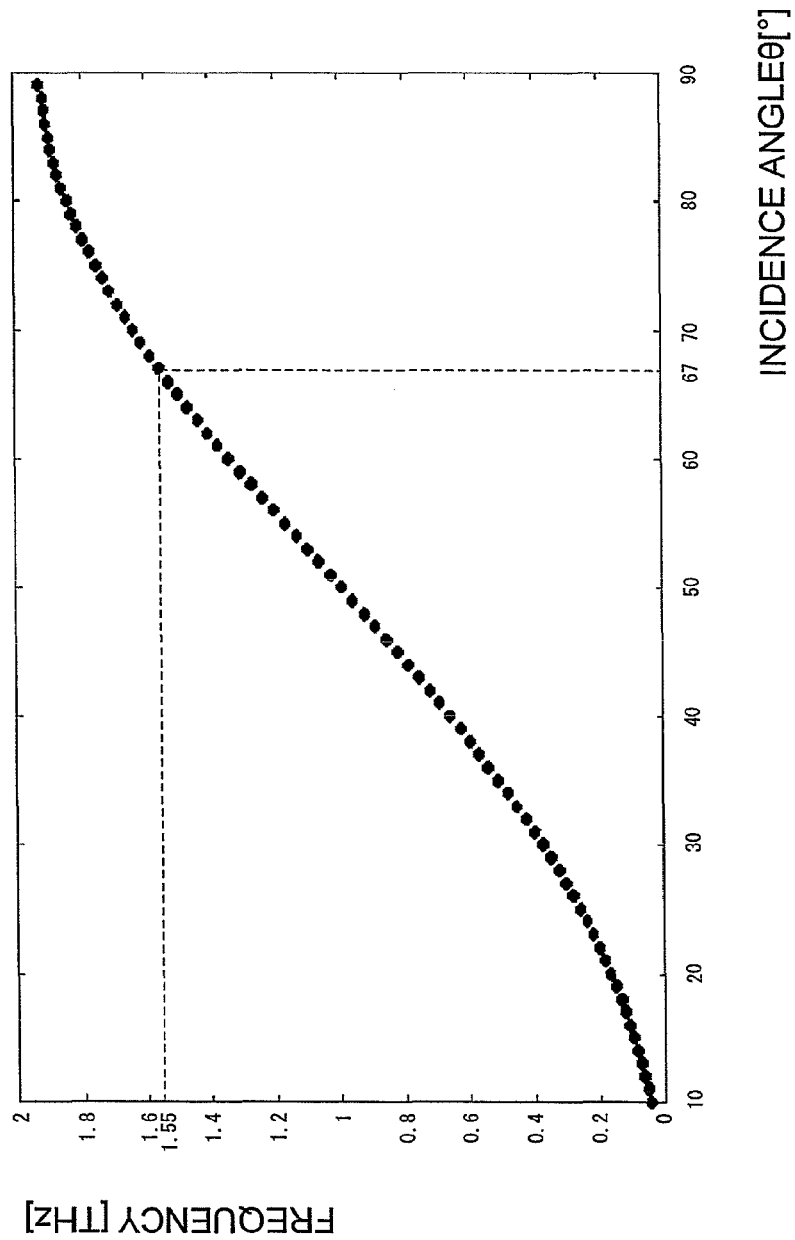
FIG. 12 is a chart illustrating the relationship between the incidence angle θ and frequency of light to be generated in Structural Example 2.

Next, the incidence angle θ of the s-polarized first incident light component (signal light) and p-polarized second incident light component (pumping light) is determined according to the frequency of the terahertz wave to be generated (step S3). The incidence angle θ is determined by the frequency of light to be generated; FIG. 12 illustrates the relationship between the incidence angle θ and the frequency of light to be generated when the composite photonic crystal structure 122 is chosen as the resonator structure 12. When light at 1.55 THz is to be generated, for example, the incidence angle θ can be set to 67° as illustrated in FIG. 12.

Figure 13:
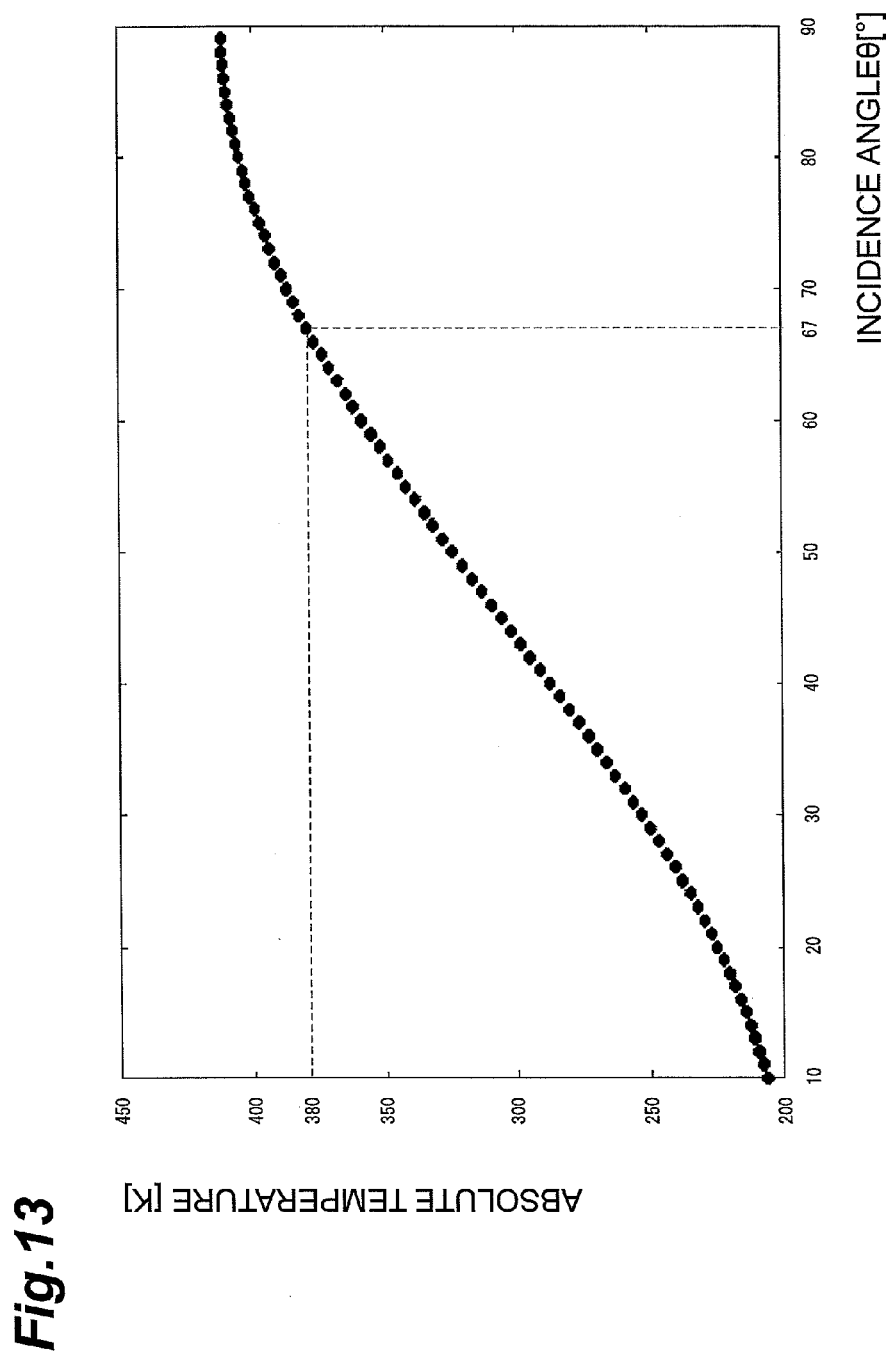
FIG. 13 is a chart illustrating the relationship between the incidence angle θ and temperature in Structural Example 2.

Returning to FIG. 7, as the next process, the frequency and intensity of pumping light, the frequency and intensity of signal light, and the temperature of the composite photonic crystal structure 122 are determined (step S4). When light at 1.55 THz is to be generated as mentioned above, for example, the frequency of pumping light is kept constant at about 281.95 THz (wavelength: 1064 nm), and its intensity is set to 1 MW/cm$^2$. The intensity is desirably as high as possible in view of conversion efficiency. The frequency of signal light can be determined by 281.95 THz—the difference frequency (the frequency of light to be generated) and thus is set to about 280.4 THz. The intensity of signal light is on a par with or lower than the intensity of pumping light. When the incidence angle θ is set to 67° in order to generate light at 1.55 THz, for example, the temperature of the composite photonic crystal structure 122 can be set to 380 K as an absolute temperature as illustrated in FIG. 13. The frequency of pumping light is kept constant at about 281.95 THz (wavelength: 1064 nm) as mentioned above under temperature regulation.

Figure 14:
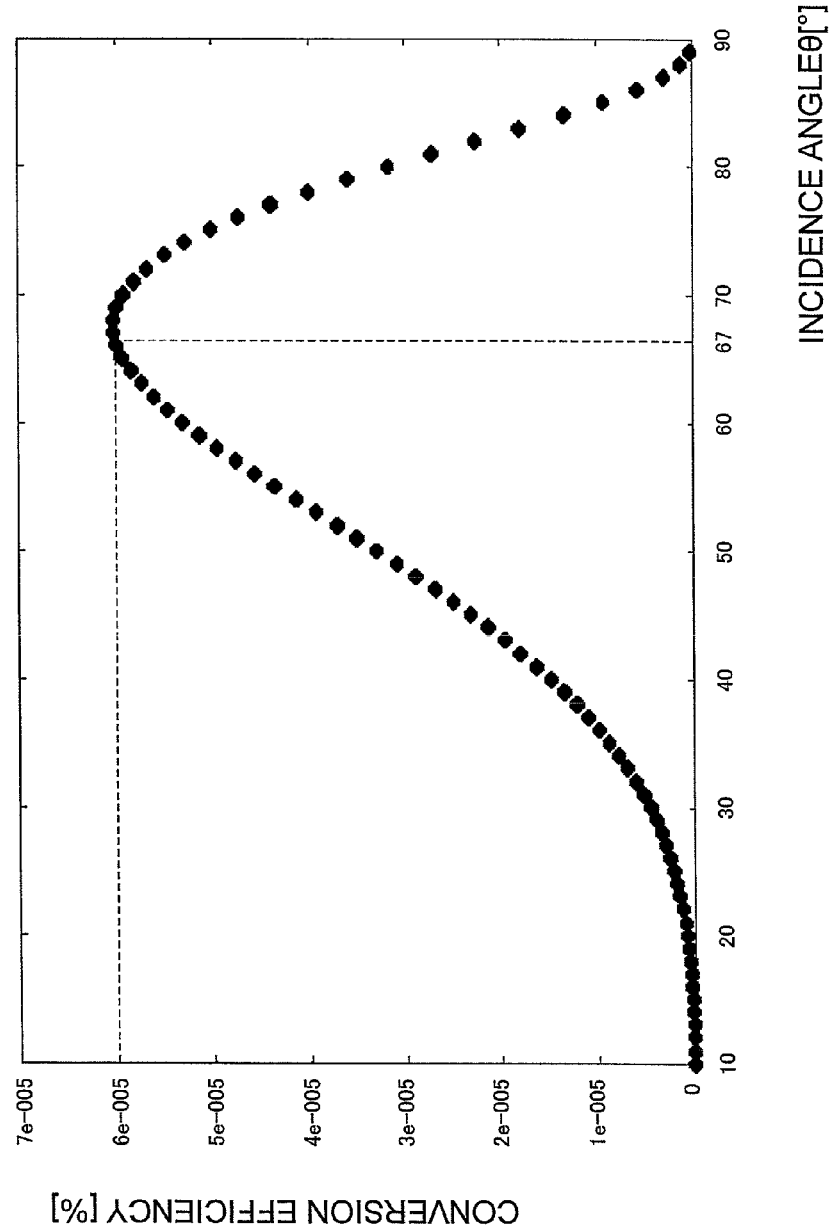
FIG. 14 is a chart illustrating the relationship between the incidence angle θ and conversion efficiency in Structural Example 2.

The foregoing generates desirable light at 1.55 THz. FIG. 14 illustrates the conversion efficiency at this time. As illustrated in FIG. 14, when the incidence angle θ is 67° while the composite photonic crystal structure 122 is under temperature regulation at 380 K, the conversion efficiency is 6 e-005%. In view of results in other frequency ranges, the conversion efficiency rises as the incidence angle θ is made greater, so that the maximum value of conversion efficiency appears in the vicinity of 67°. Though FIG. 14 represents 6 e-005% as the maximum conversion efficiency since the confinement effect is weakened in view of performances of readily usable laser light sources at present, a higher conversion efficiency value can be obtained by changing conditions. Superior points of this structural example, which are the same as those mentioned in Structural Example 1, will not be described.

Structural Example 3

Figure 15:
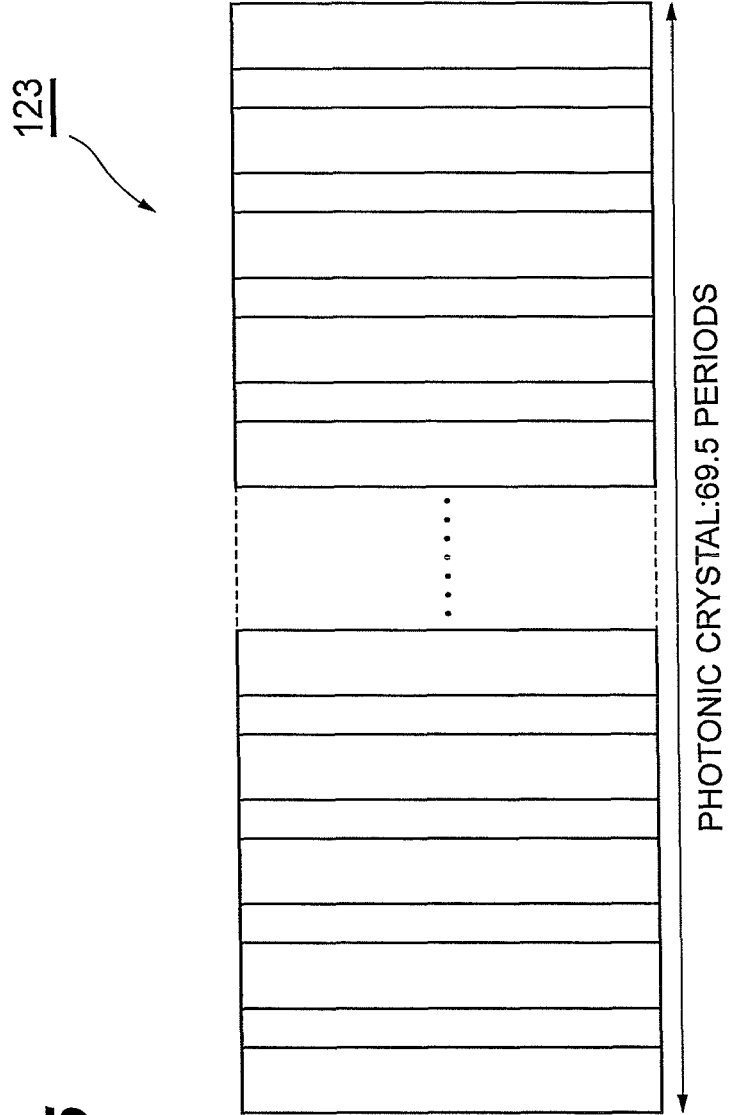
FIG. 15 is a conceptual diagram of a simple photonic crystal 123 employed as the resonator structure 12 in Structural Example 3.

The next structural example relates to a case employing the simple photonic crystal 123 as the resonator structure 12. FIG. 15 is a conceptual diagram of the composite photonic crystal structure 123 in this case. As illustrated in FIG. 15, the simple photonic crystal 123 has a structure comprising a photonic crystal constituted by a multilayer composed of active and inactive layers respectively made of GaAs and AlAs layers.

Parameters in the simple photonic crystal 123 are listed in the following.
1. GaAs layers in the photonic crystal
Film thickness: 74.74 nm
Number of layers: 70
Refractive index: 3.588 (wavelength: 1064 nm)
2. AlAs layers in the photonic crystal
Film thickness: 87.31 nm
Number of layers: 69
Refractive index: 2.989 (wavelength: 1064 nm)
3. Total crystal length: 11256.19 nm The procedure of generating output light in a desirable terahertz region by using the terahertz light generation device 1 equipped with thus constructed simple photonic crystal 123 is as illustrated in the flowchart of FIG. 7. First, a wavelength of a terahertz wave to be generated is determined according to its use (step S1). Subsequently, the kind of resonator structure 12 is determined (step S2). The simple photonic crystal 123 is assumed to be chosen in this structural example.

Figure 16:
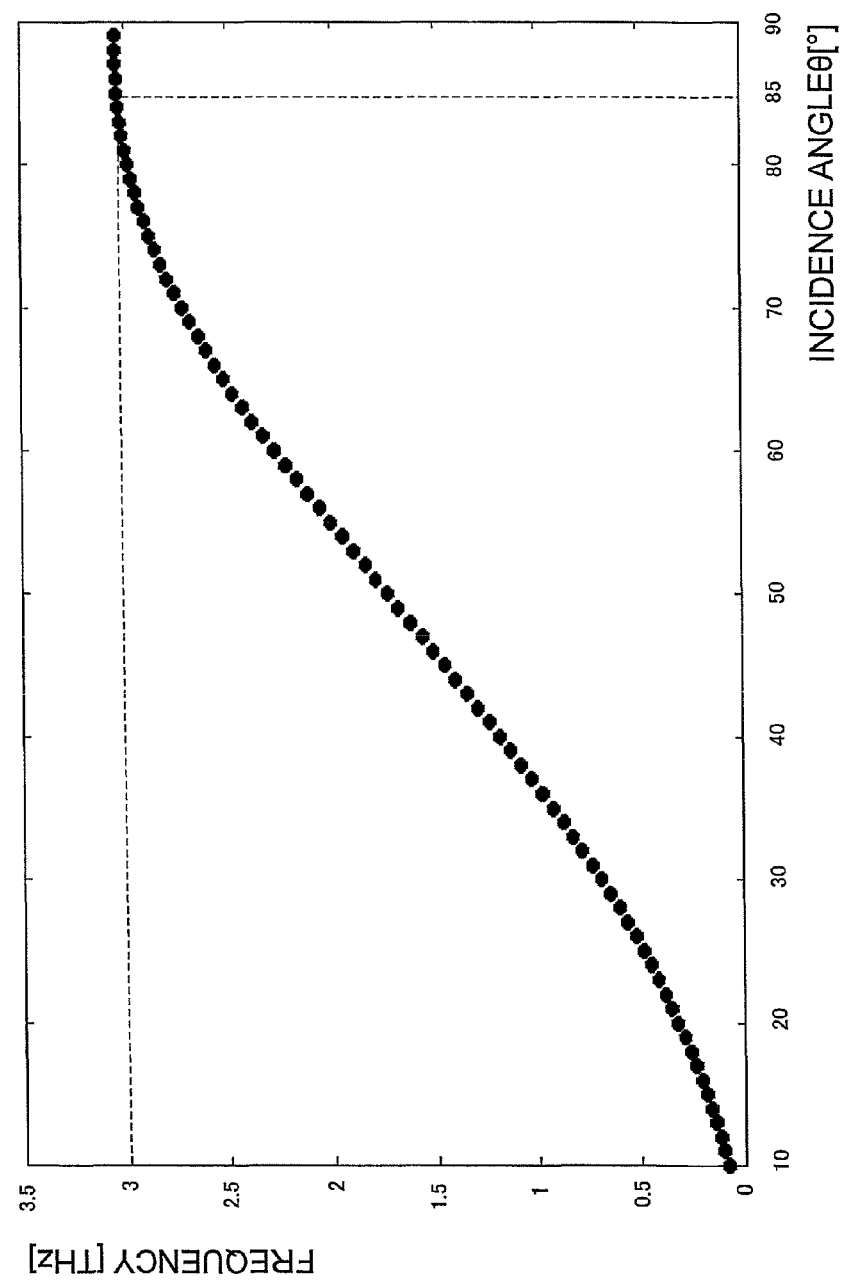
FIG. 16 is a chart illustrating the relationship between the incidence angle θ and frequency of light to be generated in Structural Example 3.

Next, the incidence angle θ of the s-polarized first incident light component (signal light) and p-polarized second incident light component (pumping light) is determined according to the frequency of the terahertz wave to be generated (step S3). The incidence angle θ is determined by the frequency of light to be generated; FIG. 16 illustrates the relationship between the incidence angle θ and the frequency of light to be generated when the simple photonic crystal 123 is chosen as the resonator structure 12. When light at 3 THz is to be generated, for example, the incidence angle θ can be set to 85° as illustrated in FIG. 16.

Figure 17:
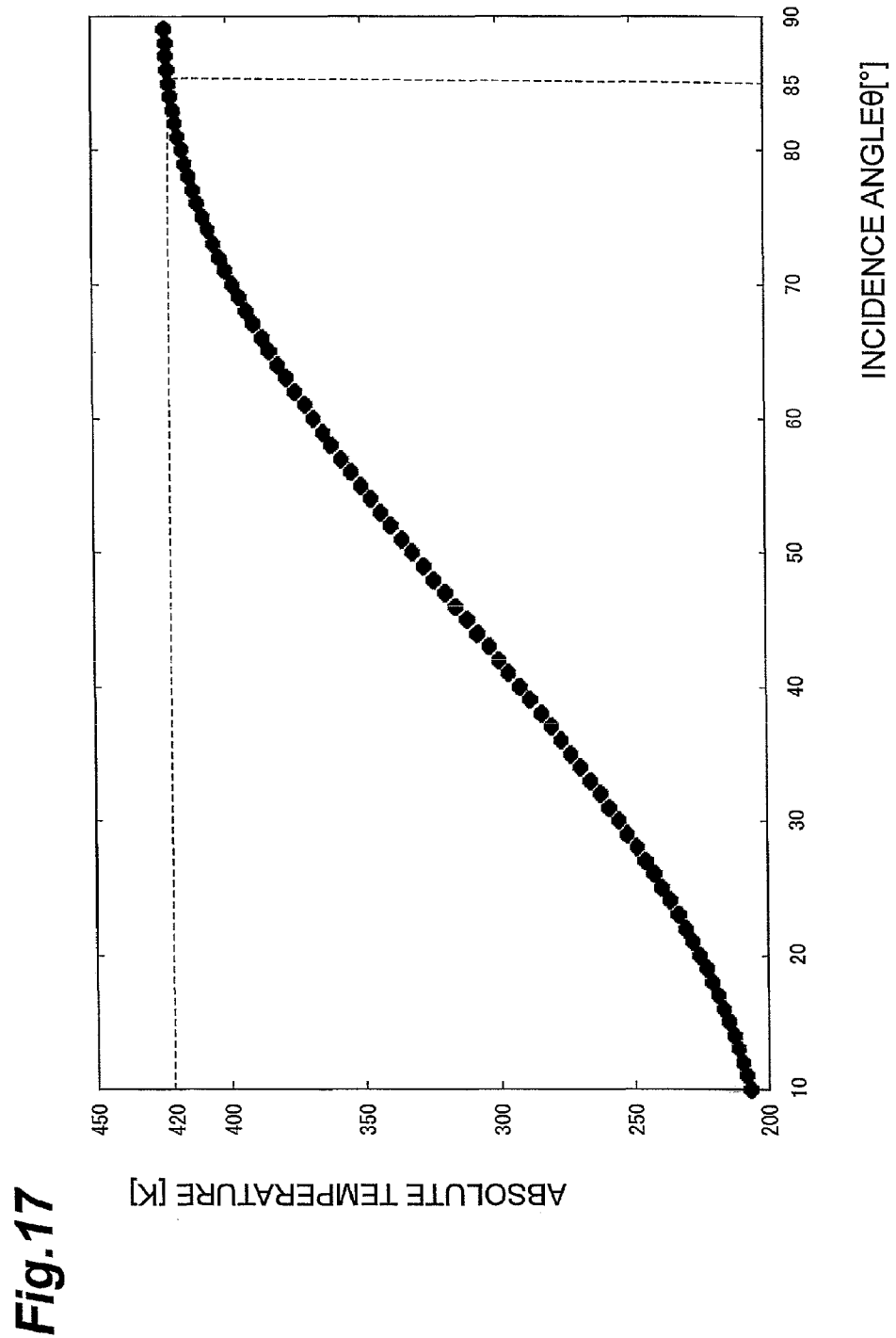
FIG. 17 is a chart illustrating the relationship between the incidence angle θ and temperature in Structural Example 3.

Returning to FIG. 7, as the next process, the frequency and intensity of pumping light, the frequency and intensity of signal light, and the temperature of the simple photonic crystal 123 are determined (step S4). When light at 3 THz is to be generated as mentioned above, for example, the frequency of pumping light is kept constant at about 281.95 THz (wavelength: 1064 nm), and its intensity is set to 1 MW/cm². The intensity is desirably as high as possible in view of conversion efficiency. The frequency of signal light can be determined by 281.95 THz—the difference frequency (the frequency of light to be generated) and thus is set to about 278.95 THz. The intensity of signal light is on a par with or lower than the intensity of pumping light. When the incidence angle θ is set to 85° in order to generate light at 3 THz, for example, the temperature of the simple photonic crystal 123 can be set to 420 K as an absolute temperature as illustrated in FIG. 17. The frequency of pumping light is kept constant at about 281.95 THz (wavelength: 1064 nm) as mentioned above under temperature regulation.

Figure 18:
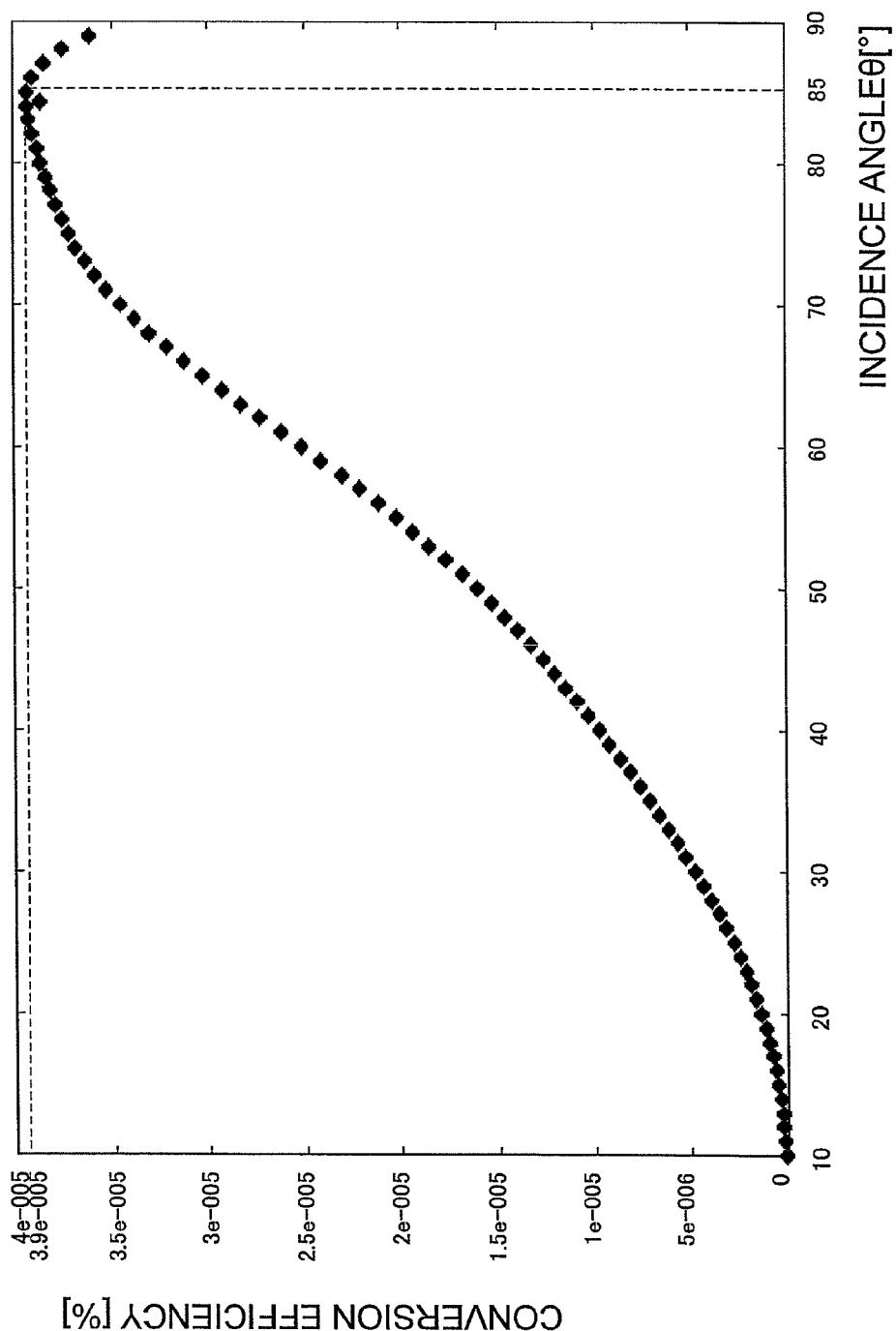
FIG. 18 is a chart illustrating the relationship between the incidence angle θ and conversion efficiency in Structural Example 3.

The foregoing generates desirable light at 3 THz. FIG. 18 illustrates the conversion efficiency at this time. As illustrated in FIG. 18, when the incidence angle θ is 85° while the simple photonic crystal 123 is under temperature regulation at 420 K, the conversion efficiency is 3.9 e-005%. In view of results in other frequency ranges, the conversion efficiency rises as the incidence angle θ is made greater, so that the maximum value of conversion efficiency appears in the vicinity of 85°. Though FIG. 18 represents 3.9 e-005% as the maximum conversion efficiency since the confinement effect is weakened in view of performances of readily usable laser light sources at present, a higher conversion efficiency value can be obtained by changing conditions. Superior points of this structural example, which are the same as those mentioned in Structural Example 1, will not be described.

Operations and Effects of the First Embodiment

Operations and effects of the terahertz light generation device 1 in accordance with the first embodiment will now be explained. The terahertz light generation device 1 of the first embodiment generates terahertz waves by using the GaAs/AlAs resonator structure 12. When light is incident on the resonator structure 12 at an angle, its transmittance spectrum shifts as the angle increases, while a difference occurs in the width of shifting frequency between the s- and p-polarized light components (see FIG. 3). This is considered to be a phenomenon occurring because of structural birefringence caused by a periodic thin film structure and attributable to the fact that the effective refractive index is changed by polarization. Here, light having two frequencies in conformity to the respective transmittance spectra of the polarized light components incident on the resonator structure can enhance the optical electric field therewithin, thereby causing strong difference frequency generation (DFG). Thus generated difference frequency reaches a terahertz region, and its conversion efficiency is high as mentioned above. In view of the fact that the first embodiment generates continuous light with the incident light intensity on the order of MW/cm², the conversion efficiency by the first embodiment is considered to be much superior to that in the prior art (in the case where the incident light intensity is on the order of GW/cm² in particular). Since the difference frequency changes with the incidence angle θ (see FIGS. 8, 12, and 16), the terahertz light generation device 1 of the first embodiment can be utilized as a frequency-variable terahertz light source.

As can be seen from the fact that the simple resonator 121, composite photonic crystal structure 122, and simple photonic crystal 123 have total crystal lengths of 8.0 μm, 6.9 μm, and 11.26 μm, respectively, the resonator structure 12 in the terahertz light generation device 1 in the first embodiment has a crystal length of several tens of micrometers at the longest. This can reduce the size of the device as a whole, whereby the terahertz light generation device 1 of the first embodiment can be employed as a highly versatile terahertz light source.

In the first embodiment, the laser oscillation units 10, 11 feed the resonator structure 12 with the first and second incident light components at the same angle, while the temperature regulator 13 performs temperature regulation for the resonator structure 12. This controls the respective resonance frequencies of the s- and p-polarized light components, so that one of the resonance frequencies becomes constant. The temperature regulation is considered to be a relatively easy control technique and thus can improve the convenience of the device structure.

Second Embodiment

The second embodiment of the present invention will now be explained. The second embodiment has a lot in common with Structural Example 2 of the first embodiment but differs therefrom in thickness of the GaAs and AlAs layers in the reflector. More specifically, the effective thickness ratio of GaAs layer to AlAs layer in the reflector=1:4 in the second embodiment. By contrast, the effective thickness ratio of GaAs layer to AlAs layer in the reflector=1:1 in Structural Example 2 of the first embodiment. In the following, differences between the second embodiment and Structural Example 2 of the first embodiment will mainly be explained while omitting their common features as much as possible.

The effective thickness ratio of GaAs layer to AlAs layer in Structural Example 2 of the first embodiment is as follows. Here, the effective thickness is a value obtained by multiplying film thickness by refractive index.
1. In the DBR part
The effective thickness of GaAs layer=79.18×3.382=267.8
The effective thickness of AlAs layer=92.49×2.895=267.8
The effective thickness ratio of GaAs layer to AlAs layer=267.8:267.8=1:1
2. In the photonic crystal part
The effective thickness of GaAs layer=72.53×3.382=245.3
The effective thickness of AlAs layer=84.72×2.895=245.3
The effective thickness ratio of GaAs layer to AlAs layer=245.3:245.3=1:1

Figure 19:
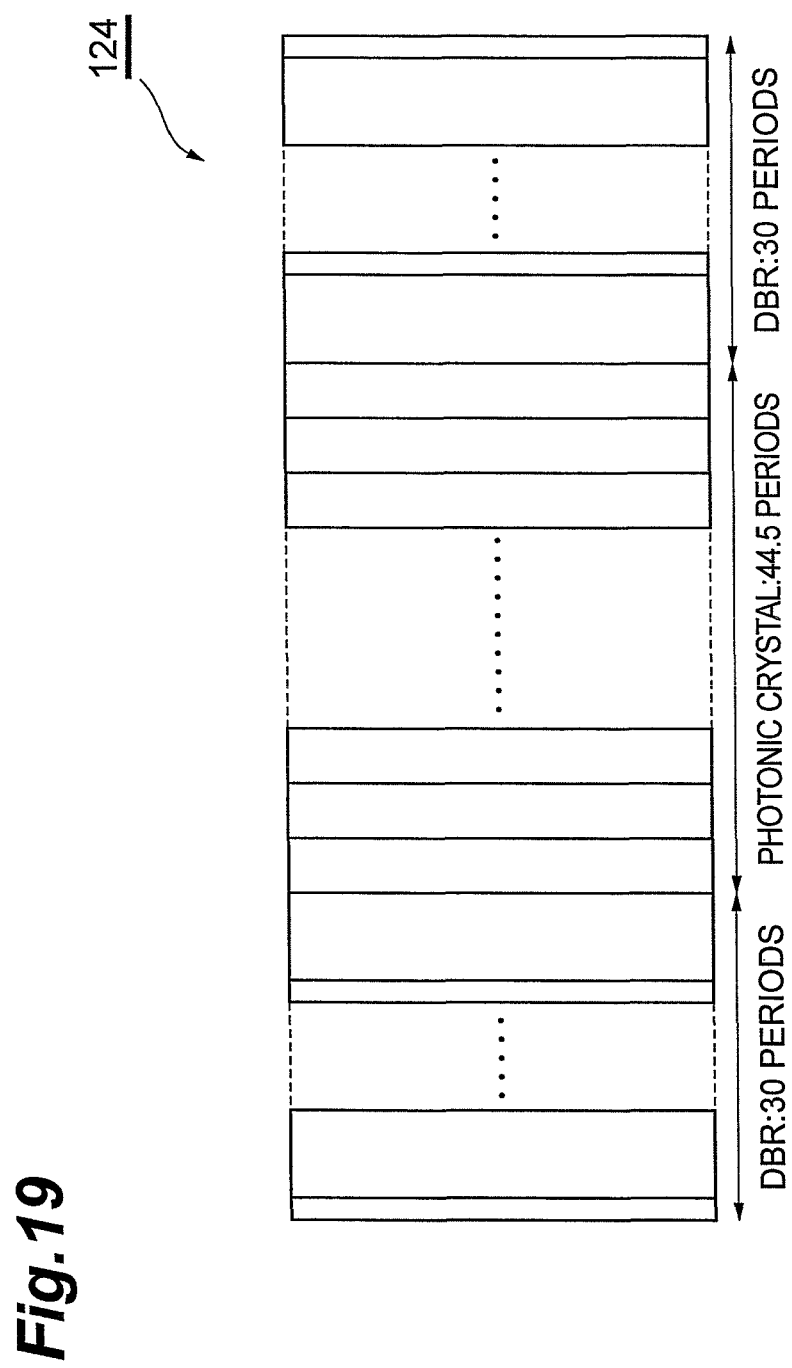
FIG. 19 is a conceptual diagram of a composite photonic crystal structure 124 in a second embodiment.

On the other hand, the second embodiment employs a composite photonic crystal structure as the resonator structure 12 of FIG. 1 as with Structural Example 2 of the first embodiment but differs therefrom in film thickness in the DBR part. FIG. 19 is a conceptual diagram of the composite photonic crystal structure 124 in the second embodiment. As illustrated in FIG. 19, the composite photonic crystal structure 124 has a structure comprising a photonic crystal constituted by a multilayer composed of active and inactive layers respectively made of GaAs and AlAs layers and a reflector (DBR) constituted by a multilayer of GaAs and AlAs layers.

Parameters in the composite photonic crystal structure 124 are listed in the following.
1. GaAs layers in the DBR
Film thickness: 31.00 nm
Number of layers: 30
Refractive index: 3.382 (wavelength: 1064 nm; temperature: 200 K)
2. AlAs layers in the DBR
Film thickness: 145.00 nm
Number of layers: 30
Refractive index: 2.895 (wavelength: 1064 nm; temperature: 200 K)
3. GaAs layers in the photonic crystal
Film thickness: 74.50 nm
Number of layers: 45

Refractive index: 3.382 (wavelength: 1064 nm; temperature: 200 K)
4. AlAs layers in the photonic crystal
Film thickness: 87.00 nm
Number of layers: 44
Refractive index: 2.895 (wavelength: 1064 nm; temperature: 200 K)
5. Number of periods in the DBR: 30 each in the front and rear, 60 periods in total
6. Total crystal length: 17740.5 nm Hence, the effective thickness ratio of GaAs layer to AlAs layer in the second embodiment is as follows:
1. In the DBR part
The effective thickness of GaAs layer=31.00×3.382=104.8
The effective thickness of AlAs layer=145.00×2.895=419.8
The effective thickness ratio of GaAs layer to AlAs layer=104.8:419.8=1:4
2. In the photonic crystal part
The effective thickness of GaAs layer=74.50×3.382=252.0
The effective thickness of AlAs layer=87.00×2.895=251.9
The effective thickness ratio of GaAs layer to AlAs layer=252.0:251.9=1:1

In the second embodiment, as illustrated in the foregoing, the respective effective thicknesses of GaAs and AlAs layers coincide with each other in the photonic crystal part, but differ from each other and yield a ratio of 1:4 in the DBR part.

Figure 20:
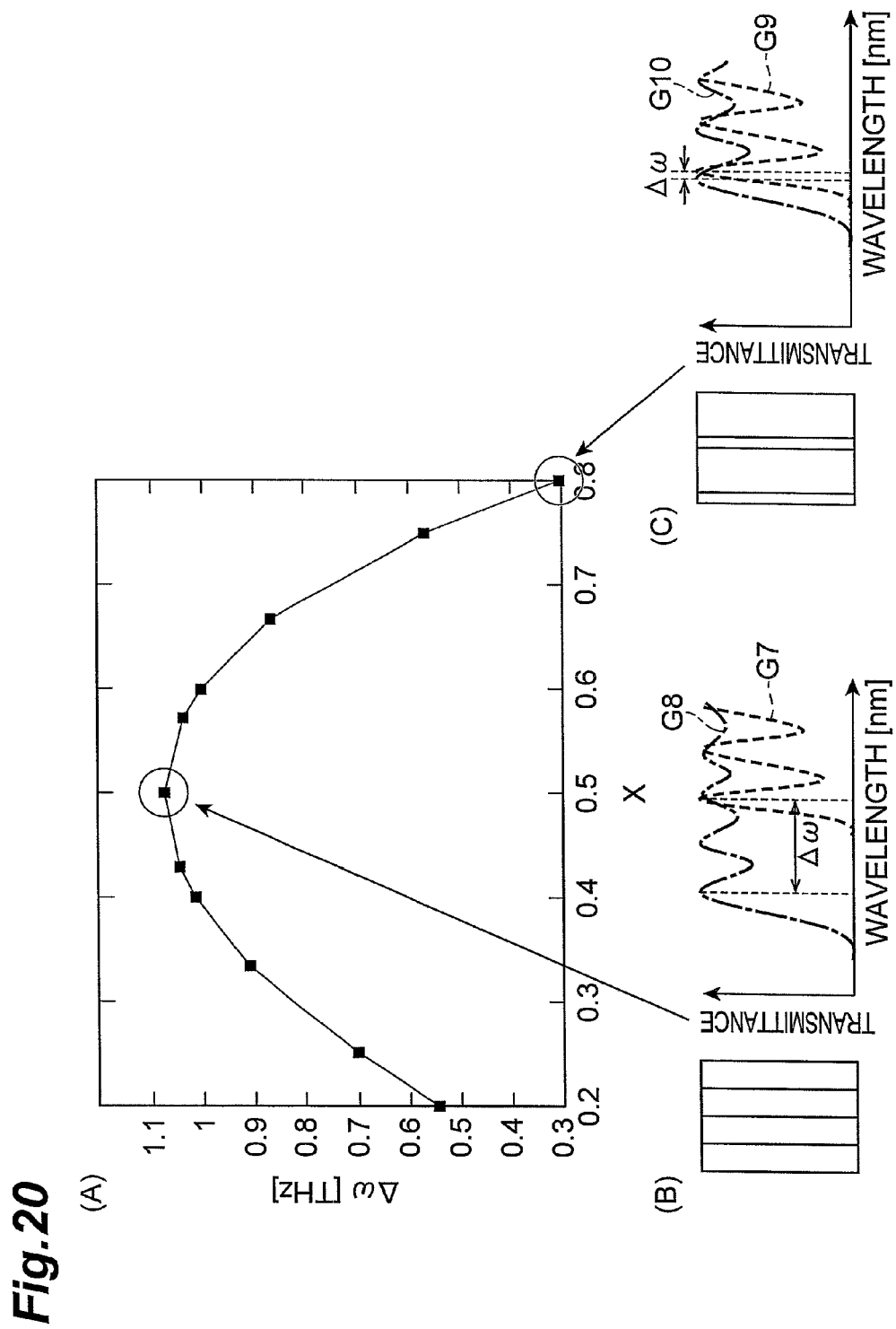
FIG. 20 is a set of diagrams for explaining the fact that a frequency difference Δω between respective transmission peaks of p- and s-polarized light components can be changed when the effective thickness ratio between GaAs and AlAs layers is varied.

Making the GaAs and AlAs layers have respective effective thicknesses different from each other, i.e., varying the effective thickness ratio between the GaAs and AlAs layers, can change the frequency difference Δω between the respective transmission peaks of the p- and s-polarized light components (corresponding to Z1 and Z2 in FIGS. 4 and 5). FIG. 20 illustrates this fact; in FIG. 20(A), X in the abscissa and the ordinate indicate the effective thickness ratio and Δω, respectively. Here, X is a value represented by the following expression:

X=effective thickness of AlAs layer/(effective thickness of GaAs layer+effective thickness of AlAs layer)

As illustrated in FIG. 20(A), a large value (1.07 THz) of difference frequency is obtained in the case where X=0.5 at which the effective thickness ratio is 1:1 (the case of FIG. 20(B), i.e., Structural Example 2 of the first embodiment), while a small value (0.3 THz) of difference frequency is obtained in the case where X=0.8 at which the effective thickness ratio is 1:4 (the case of FIG. 20(C), i.e., the second embodiment). In FIGS. 20(B) and 20(C), graphs G7 and G9 indicate transmission spectra of the s-polarized light component, while graphs G8 and G10 indicate transmission spectra of the p-polarized light component. Though X in FIG. 20 indicates the effective thickness ratio, the thickness ratio not multiplied by the refractive index exhibits a similar behavior of Δω, whereby the effective thickness ratio will simply be referred to as thickness ratio in the following explanation.

Figure 21:
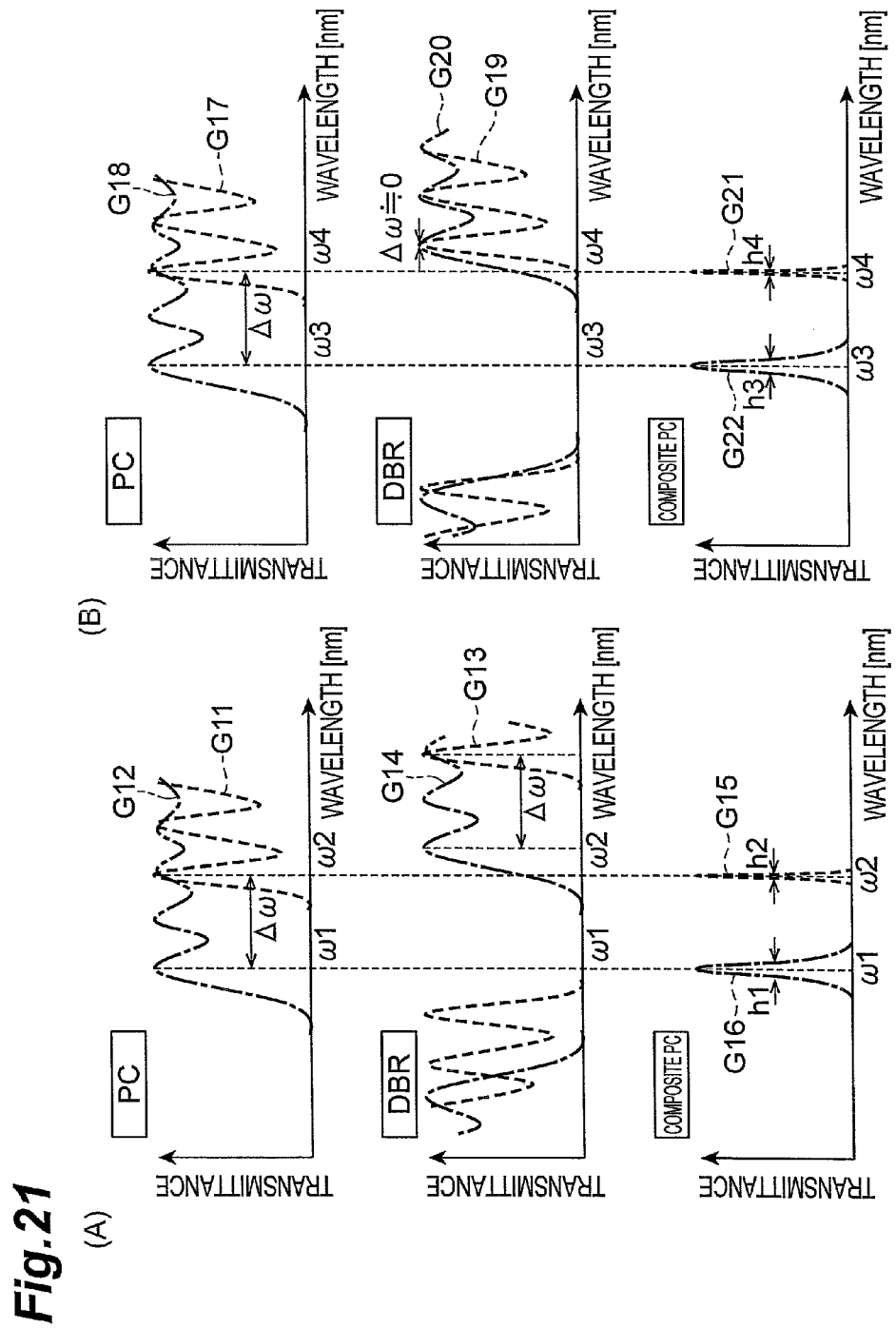
FIG. 21 is a set of charts for explaining differences in transmittance spectra between Structural Example 2 of the first embodiment (A) and the second embodiment (B)

FIG. 21 is a set of charts for explaining differences in transmittance spectra between Structural Example 2 of the first embodiment and the second embodiment. FIG. 21(A) illustrates the case of Structural Example 2 of the first embodiment, while FIG. 21(B) illustrates the case of the second embodiment. Each of them constructs the photonic crystal (PC) at the thickness ratio of 1:1 and uses the largest Δω. As for the DBR, however, Structural Example 2 of the first embodiment in FIG. 21(A) uses a thickness ratio of 1:1, while the second embodiment in FIG. 21(B) uses a thickness ratio of 1:4, for example, such that one is thicker than the other. In FIG. 21, graphs G11, G13, G15, G17, G19, and G21 illustrate transmission spectra of the s-polarized light component, while graphs G12, G14, G16, G18, G20, and G22 illustrate transmission spectra of the p-polarized light component.

In the case of Structural Example 2 of the first embodiment illustrated in FIG. 21(A), the DBR exhibits high reflectance at a PC peak wavelength ω1 of the p-polarized light component (the PC peak wavelength ω1 of the p-polarized light component corresponds to the center part of a depression of the graph G14, i.e., the center part of the photonic bandgap) and at a PC peak wavelength ω2 of the s-polarized light component (the PC peak wavelength ω2 of the s-polarized light component corresponds to the center part of a depression of the graph G13, i.e., the center part of the photonic bandgap) and thus has about the same reflectance for both the p- and s-polarized light components. In the case of the second embodiment illustrated in FIG. 21(B), on the other hand, the DBR exhibits high reflectance at a PC peak wavelength ω3 of the p-polarized light component (the PC peak wavelength ω3 of the p-polarized light component corresponds to the center part of a depression of the graph G20, i.e., the center part of the photonic bandgap) and low reflectance at a PC peak wavelength ω4 of the s-polarized light component (the PC peak wavelength ω4 of the s-polarized light component does not correspond to the center part of a depression of the graph G19, i.e., the center part of the photonic bandgap) and thus has a high confinement effect only for the p-polarized light component. As a result, when a composite photonic crystal is employed, Structural Example 2 of the first embodiment in FIG. 21(A) yields a large difference |h1−h2| between the respective full widths at half maximum h1, h2 of the p- and s-polarized light components as illustrated in the lowermost stage of FIG. 21(A), while the second embodiment in FIG. 21(B) yields a small difference |h3−h4| between the respective full widths at half maximum h3, h4 of the p- and s-polarized light components as illustrated in the lowermost stage of FIG. 21(A). The full width at half maximum (FWHM) is a value indicating a difference in wavelength (frequency) which is 0.5 times the peak value of a transmission peak.

Figure 22:
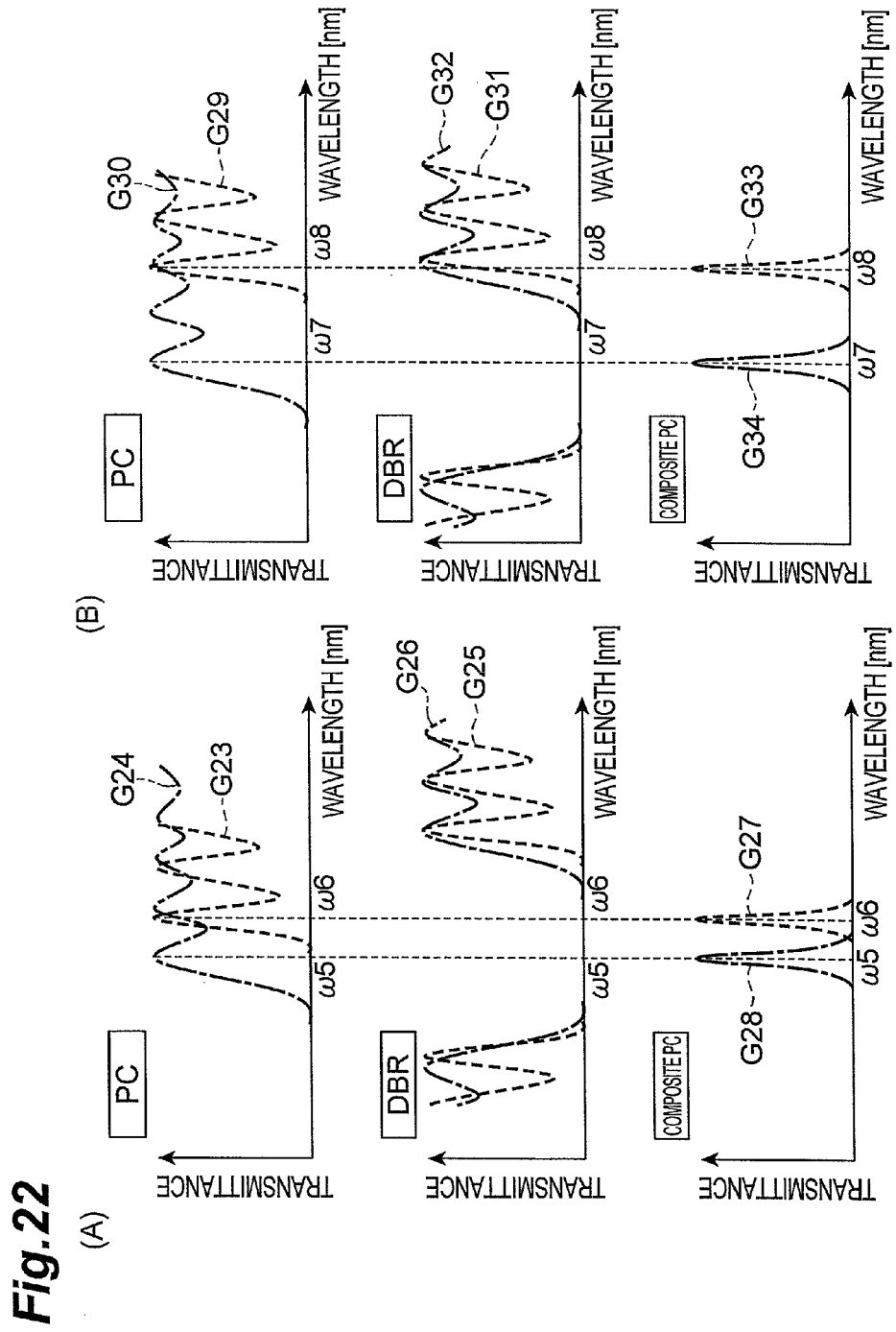
FIG. 22 is a set of charts illustrating operations at low-angle incidence (A) and high-angle incidence (B) in the second embodiment.

FIG. 22 is a set of charts illustrating operations at low-angle incidence and high-angle incidence in the second embodiment. FIGS. 22(A) and 22(B) illustrate the respective cases of low-angle incidence and high-angle incidence. In the low-angle incidence of FIG. 22(A), the PC peak wavelengths (ω5, ω6) of p- and s-polarized light components are located in a high reflection part of the DBR, whereby the DBR exhibits high reflectance for both of them. In the high-angle incidence of FIG. 22(B), on the other hand, the DBR exhibits high reflectance at the PC peak wavelength ω7 of the p-polarized light component and low reflectance at the PC peak wavelength ω8 of the s-polarized light component. While Structural Example 2 of the first embodiment may enhance and reduce confinement effects for the p- and s-polarized light components, respectively, as the angle increases, so that only the s-polarized light component can be utilized well, the second embodiment adjusts the thickness ratio between the GaAs and AlAs layers and thus can keep an appropriate full width at half maximum, thereby making it possible to keep the best full width at half maximum either at low or high angle. In FIG. 22, graphs G23, G25, G27, G29, G31, and G33 illustrate transmission spectra of the s-polarized light component, while graphs G24, G26, G28, G30, G32, and G34 illustrate transmission spectra of the p-polarized light component.

The procedure of generating output light in a desirable terahertz region by using the terahertz light generation device 1 equipped with thus constructed composite photonic crystal structure 124 is as illustrated in the flowchart of FIG. 7. First, a wavelength of a terahertz wave to be generated is determined according to its use (step S1). Subsequently, the kind of resonator structure 12 is determined (step S2). The composite photonic crystal structure 124 is assumed to be chosen in this structural example.

Figure 23:
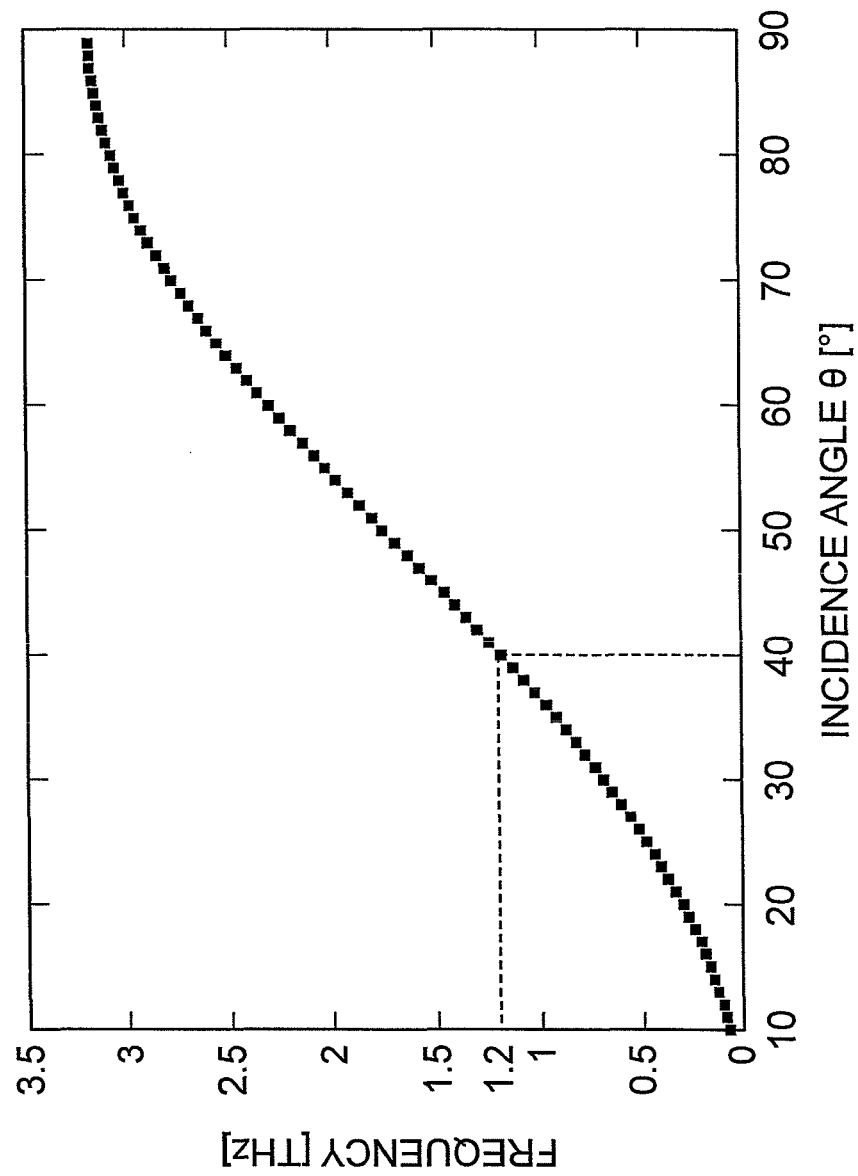
FIG. 23 is a chart illustrating the relationship between the incidence angle θ and frequency of light to be generated in the second embodiment.

Next, the incidence angle θ of the s-polarized first incident light component (signal light) and p-polarized second incident light component (pumping light) is determined according to the frequency of the terahertz wave to be generated (step S3). The incidence angle θ is determined by the frequency of light to be generated; FIG. 23 illustrates the relationship between the incidence angle θ and the frequency of light to be generated when the composite photonic crystal structure 124 is chosen as the resonator structure. When light at 1.2 THz is to be generated, for example, the incidence angle θ can be set to 40° as illustrated in FIG. 23. In the second embodiment, as the incidence angle increases, the difference (Δω) between the respective transmittance spectra of the p- and s-polarized light components becomes greater, thereby making the generation frequency higher.

Figure 24:
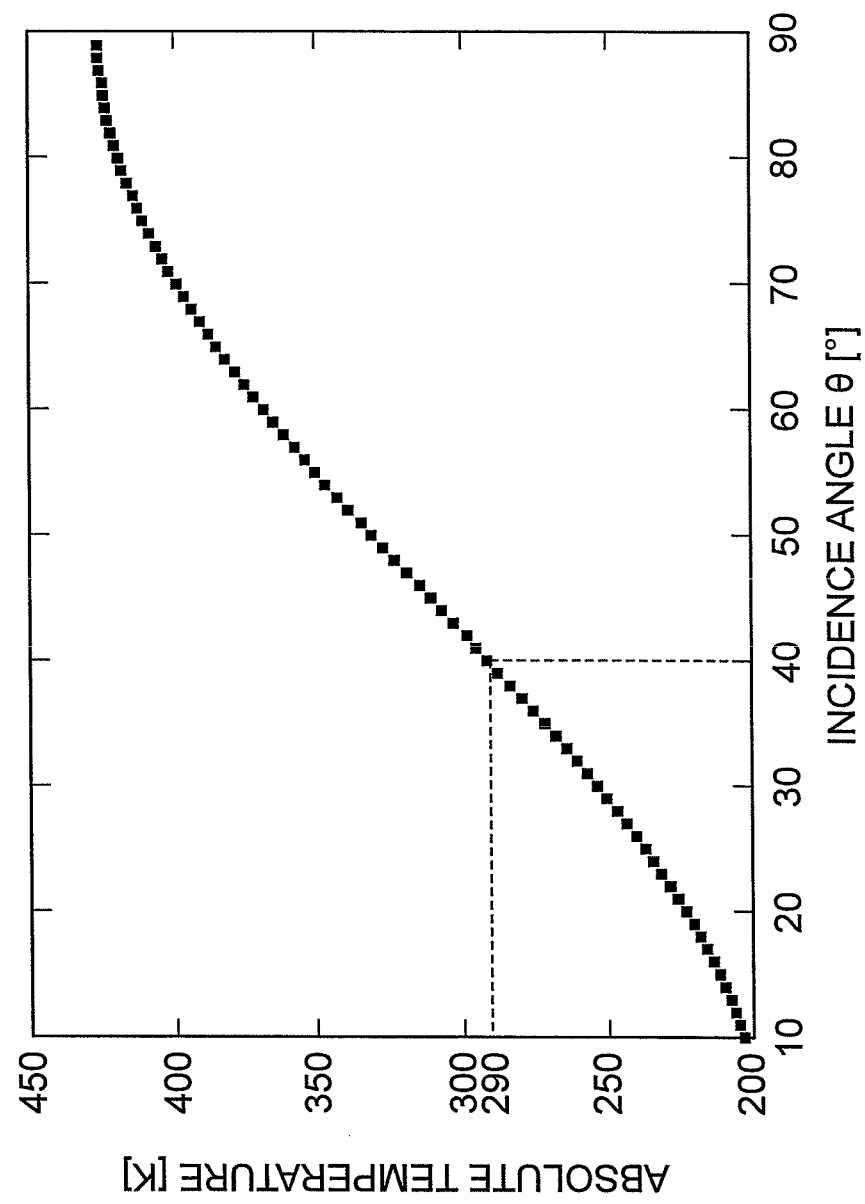
FIG. 24 is a chart illustrating the relationship between the incidence angle θ and temperature in the second embodiment.

Returning to FIG. 7, as the next process, the frequency and intensity of pumping light, the frequency and intensity of signal light, and the temperature of the composite photonic crystal structure 124 are determined (step S4). When light at 1.2 THz is to be generated as mentioned above, for example, the frequency of pumping light is kept constant at about 281.95 THz (wavelength: 1064 nm), and its intensity is set to 1 MW/cm$^2$. The intensity is desirably as high as possible in view of conversion efficiency. The frequency of signal light can be determined by 281.95 THz—the difference frequency (the frequency of light to be generated) and thus is set to about 280.85 THz. The intensity of signal light is on a par with or lower than the intensity of pumping light. When the incidence angle θ is set to 40° in order to generate light at 1.2 THz, for example, the temperature of the composite photonic crystal structure 124 can be set to 290 K as an absolute temperature as illustrated in FIG. 24. The frequency of pumping light is kept constant at about 281.95 THz (wavelength: 1064 nm) as mentioned above under temperature regulation. In the second embodiment, as the incidence angle increases, the shift in transmittance spectra becomes greater, thereby making it necessary to change the sample temperature correspondingly.

Figure 25:
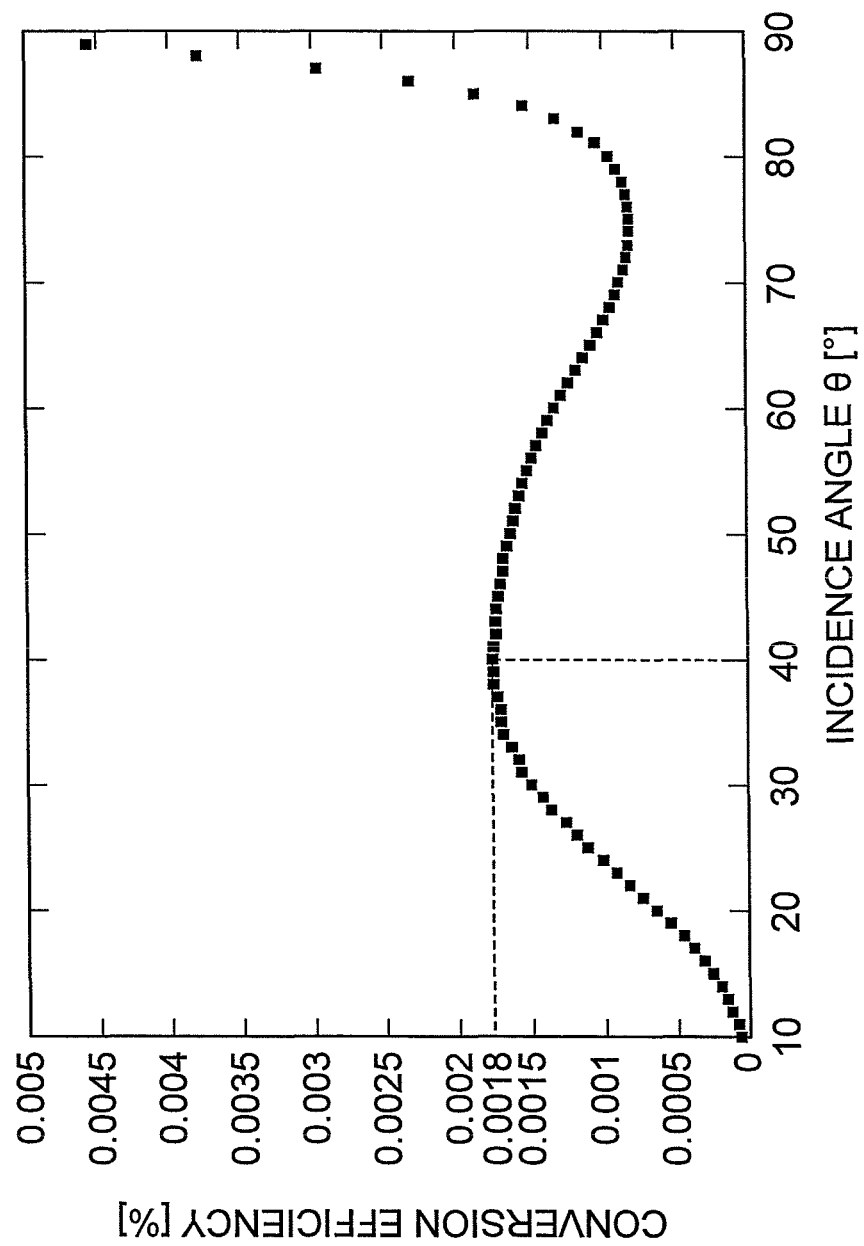
FIG. 25 is a chart illustrating the relationship between the incidence angle θ and conversion efficiency in the second embodiment.
Figure 26:
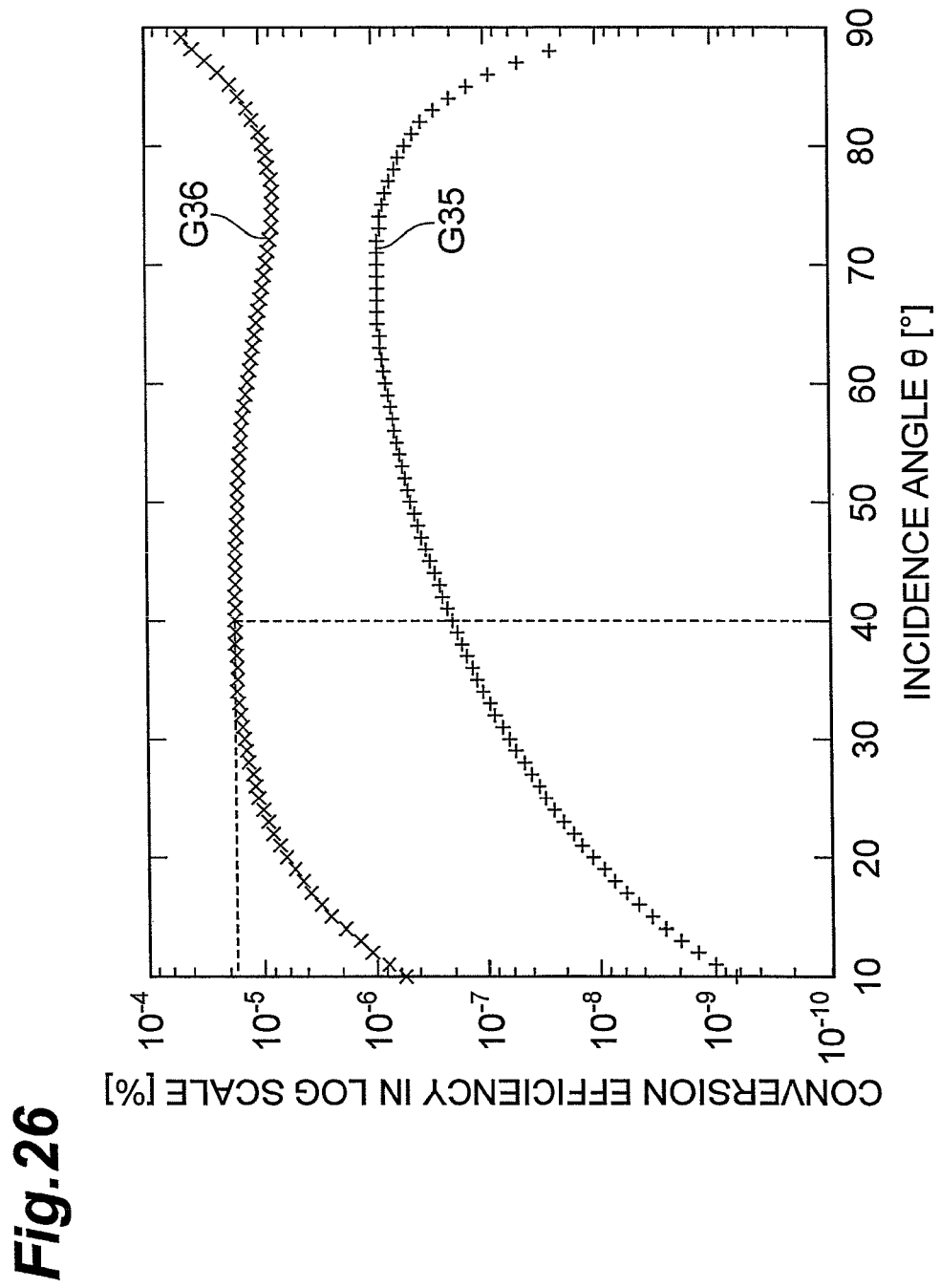
FIG. 26 is a chart for illustrating the conversion efficiency in Structural Example 2 of the first embodiment and that in the second embodiment in comparison with each other.

The foregoing generates desirable light at 1.2 THz. FIG. 25 illustrates the conversion efficiency at this time. As illustrated in FIG. 25, when the incidence angle θ is 40° while the composite photonic crystal structure 122 is under temperature regulation at 290 K, the conversion efficiency is 1.8 e-003%. It is seen to achieve an improvement in conversion efficiency by two digits or more when compared with the results of Structural Example 2 of the first embodiment illustrated in FIG. 14. FIG. 26 is a chart for illustrating the conversion efficiency in Structural Example 2 of the first embodiment and that in the second embodiment in comparison with each other. Graphs G35 and G36 illustrate the respective conversion efficiencies in Structural Example 2 of the first embodiment and the second embodiment. The conversion efficiency in the second embodiment is seen to be higher than that in Structural Example 2 of the first embodiment at all the incidence angles. For convenience in representation, FIG. 26 indicates the conversion efficiency in a log scale.

Figure 27:
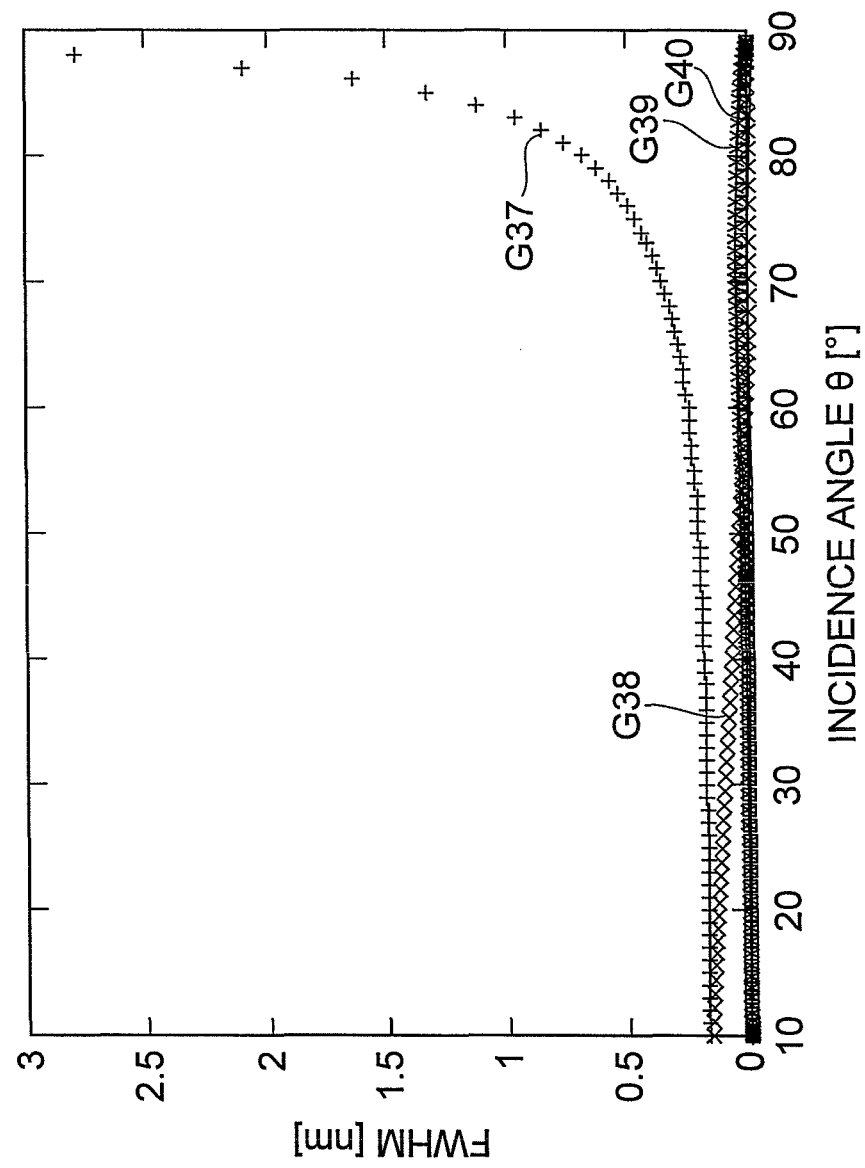
FIG. 27 is a chart for illustrating the full width at half maximum in Structural Example 2 of the first embodiment and that in the second embodiment in comparison with each other.

FIG. 27 is a chart for illustrating the full width at half maximum in Structural Example 2 of the first embodiment and that in the second embodiment in comparison with each other. Graphs G37 and G38 illustrate the respective full widths at half maximum of the p- and s-polarized light components in Structural Example 2 of the first embodiment, while graphs G39 and G40 illustrate the respective full widths at half maximum of the p- and s-polarized light components in the second embodiment. In the second embodiment illustrated by the graphs G39 and G40, the full width at half maximum in each of the polarized light components is near the ideal full width at half maximum of 0.01 [nm] and only 0.055 [nm] at the maximum. In Structural Example 2 of the first embodiment illustrated by the graphs G37 and G38, on the other hand, the full width at half maximum of the s-polarized light component becomes 0.01 [nm] in the vicinity of an incidence angle of 70°, where the full width at half maximum of the p-polarized light component increases to 0.35 [nm].

Figure 28:
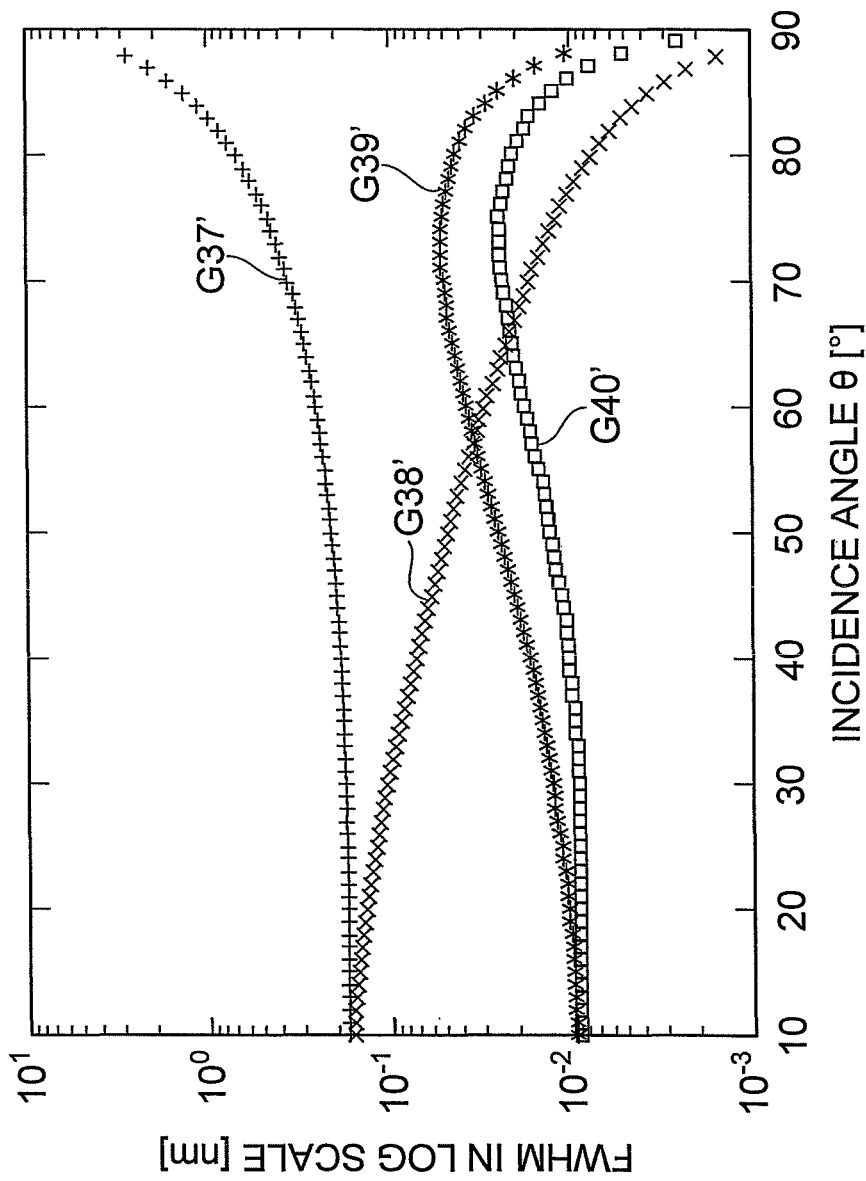
FIG. 28 is a chart representing the full width at half maximum comparison of FIG. 27 in a log scale.

FIG. 28 is a chart illustrating the full width at half maximum comparison in a log scale for convenience in representation. In conformity to FIG. 27, the same numbers are used in the graphs. In the case of Structural Example 2 in the first embodiment, as illustrated in FIG. 28, the difference in full width at half maximum between the p- and s-polarized light components becomes greater as the incidence angle increases (see graphs G37' and G38'). In the case of the second embodiment, on the other hand, the difference in full width at half maximum between the p- and s-polarized light components is small even when the incidence angle is large (see graphs G39' and G40'). Since the difference in full width at half maximum is thus constant, both of the p- and s-polarized light components can enter the inside of the crystal even at higher angle, thereby contributing to terahertz wave generation. Since the p- and s-polarized light components have small full widths at half maximum, the electric field enhancement effect within the crystal is so high that an increase in conversion efficiency can be expected.

FIG. 29 is a chart for illustrating comparisons of performances between the second embodiment and other techniques. An example of the other techniques to be compared in FIG. 29 in the case of GaAs quasi-phase matching is the technique described in the following Reference Literature 2. An example in the case of GaP quasi-phase matching is the technique described in the following Reference Literature 3. Examples of the following Reference Literatures 2 and 3 illustrate those yielding the highest conversion efficiency in recent literatures.

Reference Literature 2: Joseph E. Schaar, et al. "Terahertz Sources Basedon Intracavity Parametric Down-conversion in Quasi-Phase-Matched Garllium Arsenide," IEEE Jounal Topics In Quantum Electronics, vol. 14, No. 2, 2008

Reference Literature 3: Eliot B. Petersen, et al. "Efficient parametric terahertz generation in quasi-phase-matched GaP through cavity enhanced difference-frequency genaration," Appl. Phys. Lett. 98, 121119, 2011

When the techniques of Reference Literatures 2 and 3 are compared with the second embodiment, the second embodiment is certainly inferior in terms of conversion efficiency and output intensity. However, it should be noted that the conversion efficiency and output intensity are concerned with pulse responses in the techniques of Reference Literatures 2 and 3 and a continuous light source in the second embodiment. Since the conversion efficiency tends to be higher in pulse responses than in continuous light sources in general, the conversion efficiency and output intensity in the second embodiment cannot simply be considered inferior to those in the techniques of Reference Literatures 2 and 3. It should also be noted that the techniques of Reference Literatures 2 and 3 cannot calculate the conversion efficiency and output intensity in continuous light sources. By contrast, the second embodiment can calculate the conversion efficiency and output intensity for continuous light sources which are needed more in the market.

Since there are only a small number of literatures for continuous light sources at present, a comparison with a continuous cascade laser must be made if a comparison with a continuous light source is necessary. As illustrated in the following Reference Literature 4, however, the cascade laser has an output intensity of about 300 nW at normal temperature and thus cannot be said to make the frequency variable. That is, effects of improving the output intensity and making the frequency variable, which are achieved in the second embodiment, cannot be expected in the cascade laser. As illustrated in the above-mentioned Non Patent Literature 4, the cascade laser is also problematic in that it can output a region of 0.5 to 3 THz, which is considered the most important, with a high intensity only at a low temperature of 10 K, for example. By contrast, the second embodiment is not restricted so as to be operable under low temperature and so forth.

Reference Literature 4: Mikhail A. Belkin, et al. "Room temperature terahertz quantum cascade laser source based on intracavity difference-frequency generation," Appl. Phys. Lett. 92, 201101, 2008

While the crystal itself is about 6 mm in each of Reference Literatures 2 and 3, a resonator is attached thereto so as to raise the conversion efficiency, whereby the size of the resonator is taken as the element length. In the second embodiment, by contrast, the crystal itself is like a resonator, whereby the optical system is expected to become smaller.

Though preferred embodiments of the present invention have been explained in the foregoing, the present invention is not limited to the above-mentioned embodiments as a matter of course.

For example, while the above-mentioned embodiments generate light in the terahertz region by way of example, the idea of the present invention is not limited thereto, whereby the present invention is also applicable to generation of light in regions other than terahertz.

While the laser oscillation units 10, 11 feed the resonator structure 12 with the first and second incident light components at the same angle in the above-mentioned embodiments, the first and second incident light components may have the respective incidence angles different from each other. The incidence angles different from each other can make the s- and p-polarized light components have the respective resonance frequencies different from each other, thereby changing the frequency of output light.

Though the above-mentioned embodiments set forth the simple resonator 121, composite photonic crystal structure 122, and simple photonic crystal 123 as examples of the resonator structure 12, the double resonator described in Non Patent Literature 3, for example, is also a structure to which the system of the present invention is applicable.

Though the above-mentioned embodiments limit materials of the resonator structure 12 to GaAs and AlAs for convenience of explanation, materials which can lattice-match in order to produce a multilayer structure while having a crystal structure with broken-inversion symmetry such as ZnTe—MgTe, MgSe—ZnTe, CdTe—MgTe, InGaP/GaAs, GaAs/InGaAs, GaAs/Ge, and GaAs/AlGaAs, for example, may also be used in general.

Though the above-mentioned embodiments assume that the first and second incident light components are s- and p-polarized, respectively, for convenience of explanation, the first and second incident light components may be p- and s-polarized, respectively, for example.

Figure 30:
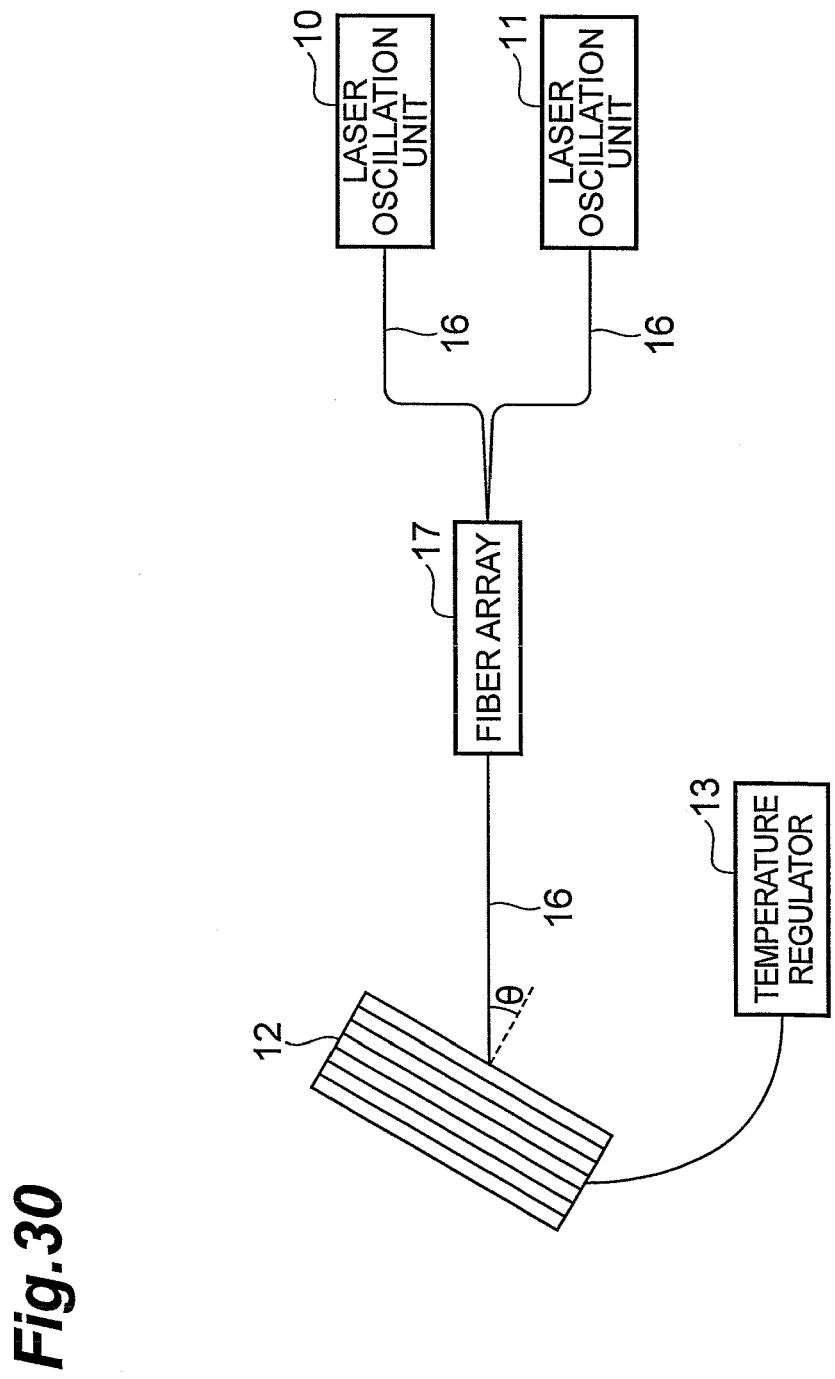
FIG. 30 is a diagram for explaining the fact that an optical system in FIG. 1 can be constructed as an optical system using fibers.

The optical system in the embodiments will now be explained in more detail. The following is in common between the first and second embodiments. That is, the optical system illustrated in FIG. 1 may be constructed as an optical system using fibers as illustrated in FIG. 30. This optical system is constructed such as to comprise a polarization-maintaining fiber 16 and a fiber array 17 in place of the mirror 14 and lens 15 in FIG. 1. In a device structure example in this case, a product known as TA pro of TOPTICA Photonics AG can be used as laser light sources in the laser oscillation units 10, 11, for instance. In this case, the generation wavelength region is 1035 to 1085 nm, generation intensity is 1000 mW, and linewidth is 0.1 to 1 MHz (typical linewidth: 5 μs). In the same product, one having a generation wavelength region of 1060 to 1083 nm, a generation intensity of 2000 mW, and a linewidth of 0.1 to 1 MHz (typical linewidth: 5 μs) may also be used. A product known as SFL-PM of NovaWave Technologies, Inc. having a generation wavelength region of 1064 nm, a generation intensity of 2000 mW, and a linewidth of less than 100 kHz may also be used. For the polarization-maintaining fiber 16 and fiber array 17, a polarization-maintaining fiber which can simultaneously transmit the p- and s-polarized light components by using a wavelength region of 1060 to 1080 nm may be employed.

Figure 31:
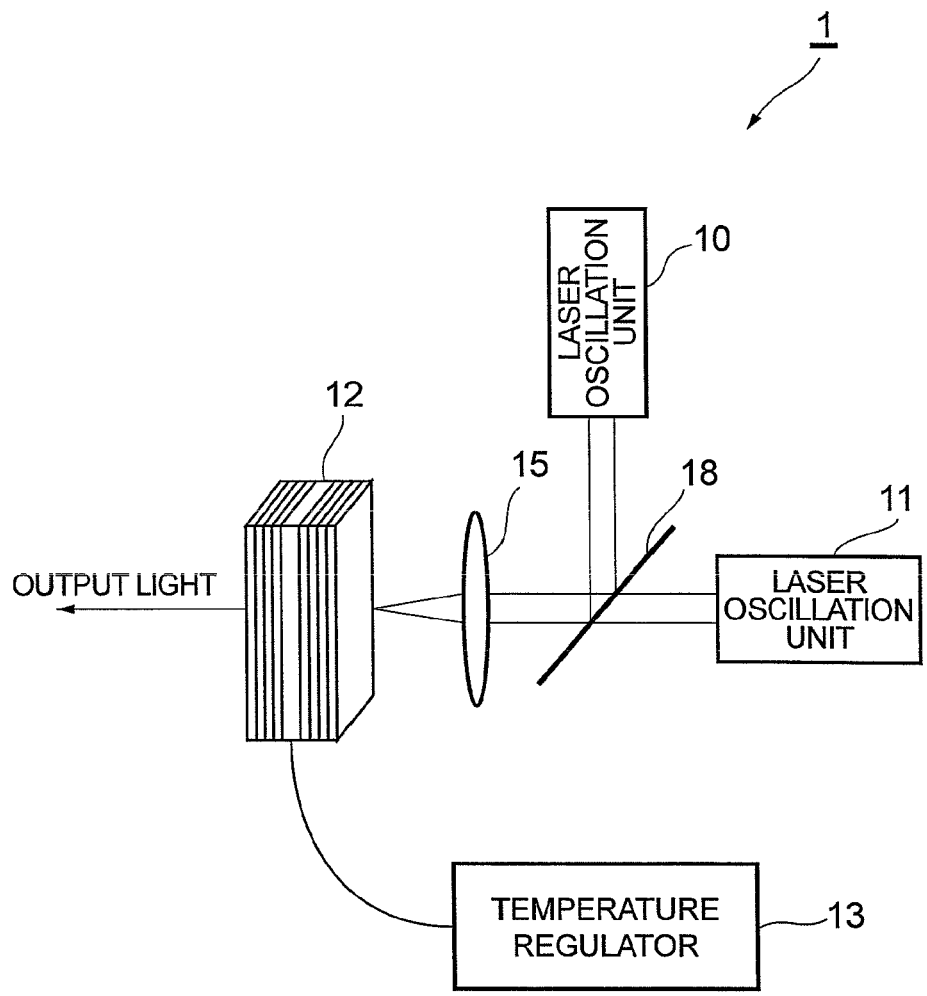
FIG. 31 is a diagram for explaining the fact that the optical system in FIG. 1 can be constructed as an optical system using a polarization beam splitter.

The optical system illustrated in FIG. 1 can also be constructed as an optical system using a polarization beam splitter as illustrated in FIG. 31, for example. This optical system is constructed such as to comprise a polarization beam splitter 18 in place of the mirror 14 in FIG. 1. In a device structure example in this case, the laser oscillation units 10, 11 may employ the same laser light sources used in the above-mentioned optical system with the fibers. As the polarization beam splitter 18, PBS-HP series of Sigma Koki Co., Ltd. or 05BC15PH.9 of Newport Corporation may be used. As the lens 15, any of NYTL and NYDL series of Sigma Koki Co., Ltd. may be used.

REFERENCE SIGNS LIST

1 . . . terahertz light generation device; 10, 11 . . . laser oscillation unit; 12 . . . resonator structure; 12a . . . principal surface in the resonator structure 12; 13 . . . temperature regulator; 14 . . . mirror; 15 . . . lens; 16 . . . polarization-maintaining fiber; 17 . . . fiber array; 18 . . . polarization beam splitter; 121 . . . simple resonator; 122, 124 . . . composite photonic crystal structure; 123 . . . simple photonic crystal

INDUSTRIAL APPLICABILITY

The present invention provides a light generation device and light generation method which can efficiently generate light having a desirable frequency.

The invention claimed is:

1. A light generation device comprising:
a resonator structure for intensifying incident light and outputting the intensified light; and
an input unit for inputting the incident light into the resonator structure;
wherein the incident light comprises first and second incident light components having polarization states different from each other and frequencies different from each other;
wherein the input unit inputs the first and second incident light components at an angle inclined from a direction perpendicular to a principal surface in the resonator structure; and wherein the resonator structure outputs light having a frequency corresponding to a difference between the respective frequencies of the first and second incident light components.

2. A light generation device according to claim 1, wherein the first and second incident light components have s- and p-polarized states, respectively, or p- and s-polarized states, respectively.

3. A light generation device according to claim 2, wherein the resonator structure is a simple resonator structure comprising a defect layer constituted by a GaAs layer and a reflector constituted by a multilayer comprising GaAs and AlAs layers.

4. A light generation device according to claim 2, wherein the resonator structure is a composite photonic crystal structure comprising a photonic crystal constituted by a multilayer comprising active and inactive layers respectively made of GaAs and AlAs layers and a reflector constituted by a multilayer comprising GaAs and AlAs layers.

5. A light generation device according to claim 2, wherein the resonator structure is a simple photonic crystal structure comprising a photonic crystal constituted by a multilayer comprising active and inactive layers respectively made of GaAs and AlAs layers.

6. A light generation device according to claim 2, wherein the frequency of the s-polarized incident light component is a resonance frequency of the s-polarized light component corresponding to the inclination angle of the input unit; and
wherein the frequency of the p-polarized incident light component is a resonance frequency of the p-polarized light component corresponding to the inclination angle of the input unit.

7. A light generation device according to claim 6, wherein the resonator structure outputs light having a frequency corresponding to the difference between the respective resonance frequencies of the s- and p-polarized light components having different values as a result of structural birefringence caused by the input unit inputting the first and second incident light components at the inclined angle.

8. A light generation device according to claim 6, wherein the resonator structure is a simple resonator structure comprising a defect layer constituted by a GaAs layer and a reflector constituted by a multilayer comprising GaAs and AlAs layers.

9. A light generation device according to claim 6, wherein the resonator structure is a composite photonic crystal structure comprising a photonic crystal constituted by a multilayer comprising active and inactive layers respectively made of GaAs and AlAs layers and a reflector constituted by a multilayer comprising GaAs and AlAs layers.

10. A light generation device according to claim 6, wherein the resonator structure is a simple photonic crystal structure comprising a photonic crystal constituted by a multilayer comprising active and inactive layers respectively made of GaAs and AlAs layers.

11. A light generation device according to claim 6, further comprising a temperature regulation unit for controlling the resonance frequencies of the s- and p-polarized light components by regulating a temperature of the resonator structure.

12. A light generation device according to claim 11, wherein the resonator structure is a simple resonator structure comprising a defect layer constituted by a GaAs layer and a reflector constituted by a multilayer comprising GaAs and AlAs layers.

13. A light generation device according to claim 11, wherein the resonator structure is a composite photonic crystal structure comprising a photonic crystal constituted by a multilayer comprising active and inactive layers respectively made of GaAs and AlAs layers and a reflector constituted by a multilayer comprising GaAs and AlAs layers.

14. A light generation device according to claim 11, wherein the resonator structure is a simple photonic crystal structure comprising a photonic crystal constituted by a multilayer comprising active and inactive layers respectively made of GaAs and AlAs layers.

15. A light generation device according to claim 1, wherein the resonator structure is a simple resonator structure comprising a defect layer constituted by a GaAs layer and a reflector constituted by a multilayer comprising GaAs and AlAs layers.

16. A light generation device according to claim 1, wherein the resonator structure is a composite photonic crystal structure comprising a photonic crystal constituted by a multilayer comprising active and inactive layers respectively made of GaAs and AlAs layers and a reflector constituted by a multilayer comprising GaAs and AlAs layers.

17. A light generation device according to claim 16, wherein the GaAs and AlAs layers in the reflector have respective thicknesses different from each other.

18. A light generation device according to claim 17, wherein the effective thickness ratio of the GaAs layer to the AlAs layer=1:1 in the photonic crystal and 1:4 in the reflector, so that the photonic crystal and reflector have effective thickness ratios different from each other.

19. A light generation device according to claim 1, wherein the resonator structure is a simple photonic crystal structure comprising a photonic crystal constituted by a multilayer comprising active and inactive layers respectively made of GaAs and AlAs layers.

20. A light generation method in a light generation device comprising a resonator structure for intensifying incident light and outputting the intensified light and an input unit for inputting the incident light into the resonator structure;
the incident light comprising first and second incident light components having polarization states different from each other and frequencies different from each other;
the method comprising:
inputting, by the input unit, the first and second incident light components at an angle inclined from a direction perpendicular to a principal surface in the resonator structure; and
outputting, by the resonator structure, light having a frequency corresponding to a difference between the respective frequencies of the first and second incident light component.

21. A light generation method according to claim 20, wherein the first and second incident light components have s- and p-polarized states, respectively, or p- and s-polarized states, respectively;
wherein the frequency of the s-polarized incident light component is a resonance frequency of the s-polarized light component corresponding to the inclination angle of the input unit;
wherein the frequency of the p-polarized incident light component is a resonance frequency of the p-polarized light component corresponding to the inclination angle of the input unit;
wherein the light generation device further comprises a temperature regulation unit; and
wherein the method further comprises the step of controlling, by the temperature regulation unit, the resonance frequencies of the s- and p-polarized light components by regulating a temperature of the resonator structure.

* * * * *